(12) United States Patent  
Zaloom

(10) Patent No.: US 9,568,141 B1  
(45) Date of Patent: Feb. 14, 2017

(54) QUICK-RELEASE UNIVERSAL TABLET HOLDER FOR DESKTOPS AND FLOOR STANDS

(71) Applicant: Joseph A. Zaloom, Falls Church, VA (US)

(72) Inventor: Joseph A. Zaloom, Falls Church, VA (US)

( * ) Notice: Subject to any disclaimer, the term of this patent is extended or adjusted under 35 U.S.C. 154(b) by 0 days.

(21) Appl. No.: 14/549,225

(22) Filed: Nov. 20, 2014

Related U.S. Application Data

(63) Continuation-in-part of application No. 14/488,054, filed on Sep. 16, 2014, which is a continuation-in-part of application No. 14/255,711, filed on Apr. 17, 2014.

(60) Provisional application No. 61/878,491, filed on Sep. 16, 2013, provisional application No. 61/906,878, filed on Nov. 20, 2013.

(51) Int. Cl.
| | |
|---|---|
| *F16M 11/20* | (2006.01) |
| *F16M 11/12* | (2006.01) |
| *F16M 13/00* | (2006.01) |
| *F16M 11/04* | (2006.01) |

(52) U.S. Cl.  
CPC .......... *F16M 11/125* (2013.01); *F16M 11/041* (2013.01); *F16M 11/12* (2013.01); *F16M 13/00* (2013.01); *F16M 2200/022* (2013.01)

(58) Field of Classification Search  
CPC ..... F16M 11/041; F16M 11/12; F16M 11/125; F16M 13/00; F16M 2200/022; F16M 11/10; G06F 1/1626; G06F 1/1607  
See application file for complete search history.

(56) References Cited

U.S. PATENT DOCUMENTS

| | | | | |
|---|---|---|---|---|
| 1,166,702 | A | | 1/1916 | Mardon et al. |
| 2,101,500 | A | * | 12/1937 | Jagus ........................ G09F 1/14 40/606.13 |
| 3,744,085 | A | | 7/1973 | Griego |
| 4,436,271 | A | * | 3/1984 | Manso .................... A47B 19/00 248/452 |
| 5,020,763 | A | * | 6/1991 | Hegarty ............... A47B 23/042 248/447 |
| 5,058,848 | A | * | 10/1991 | Ferraro ................ A47B 23/007 248/444.1 |
| 5,060,904 | A | * | 10/1991 | Hegarty ............... A47B 23/042 248/447 |
| 5,074,164 | A | | 12/1991 | Sheu |
| 5,100,098 | A | | 3/1992 | Hawkins |
| 5,168,601 | A | | 12/1992 | Liu |
| 5,933,996 | A | | 8/1999 | Chang |

(Continued)

OTHER PUBLICATIONS

"Computer Components & Imaging Supplies", Crimson Imaging Supplies, Mar. 15, 2013, two pages.

(Continued)

*Primary Examiner* — Shin Kim

(57) ABSTRACT

A tablet holder including: a mounting plate including a back surface with a coupling for a support device and a front surface with slots configured to receive arms; the arms are slidably mounted in the slots and each include an end extending outward from the mounting plate; a locking mechanism releasably securing each of the arms to the mounting plate; and for each arm, a swiveling ledge connected by a locking hinge to the end of the arm, wherein the hinge includes a releasable locking mechanism.

19 Claims, 27 Drawing Sheets

(56) References Cited

U.S. PATENT DOCUMENTS

| | | | |
|---|---|---|---|
| 6,367,760 B1* | 4/2002 | Pagano | A47B 23/042 248/451 |
| 6,983,514 B2* | 1/2006 | Lu | G06F 1/1616 16/303 |
| 7,083,155 B1* | 8/2006 | Smartt | A47B 23/04 248/441.1 |
| 7,188,818 B2* | 3/2007 | Chang | A47B 97/08 248/447 |
| 7,546,996 B2 | 6/2009 | Somji | |
| 7,568,915 B1 | 8/2009 | Lavoie | |
| 7,581,290 B2* | 9/2009 | Chang | A06F 1/1616 16/303 |
| 7,591,604 B2 | 9/2009 | Roberts | |
| 7,611,117 B1* | 11/2009 | Lang, Jr. | G06F 1/1611 248/125.8 |
| 7,712,719 B2 | 5/2010 | Derry et al. | |
| 7,770,862 B2 | 8/2010 | Chen | |
| 7,836,623 B2 | 11/2010 | Wang et al. | |
| 8,038,116 B2* | 10/2011 | Lee | A47B 23/043 248/454 |
| 8,118,274 B2 | 2/2012 | McClure et al. | |
| D672,783 S | 12/2012 | Robinson | |
| 8,382,059 B2 | 2/2013 | LeGette et al. | |
| 8,387,930 B2 | 3/2013 | Drew et al. | |
| 8,833,716 B2* | 9/2014 | Funk | F16M 13/02 248/309.1 |
| 2004/0007649 A1 | 1/2004 | Vettraino | |
| 2005/0155183 A1* | 7/2005 | Lu | A47K 3/38 16/340 |
| 2006/0084585 A1* | 4/2006 | Lin | A61K 8/37 510/118 |
| 2006/0137491 A1 | 6/2006 | Chen | |
| 2006/0175484 A1* | 8/2006 | Wood, III | F16M 11/32 248/177.1 |
| 2008/0156836 A1 | 7/2008 | Wadsworth et al. | |
| 2011/0094058 A1 | 4/2011 | Van Gennep | |
| 2012/0074272 A1* | 3/2012 | Hull | F16M 11/041 248/122.1 |
| 2012/0111881 A1* | 5/2012 | Gaddis, II | H04K 5/023 220/752 |
| 2012/0126088 A1* | 5/2012 | Whittaker | A47B 23/043 248/473 |
| 2012/0326003 A1* | 12/2012 | Solow | F16M 11/041 248/688 |
| 2013/0092805 A1* | 4/2013 | Funk | F16M 13/02 248/121 |
| 2013/0092811 A1* | 4/2013 | Funk | F16M 13/02 248/371 |
| 2013/0233984 A1* | 9/2013 | Huang | F16M 11/046 248/162.1 |
| 2013/0256478 A1* | 10/2013 | Reda | B60R 11/02 248/205.1 |
| 2013/0277520 A1* | 10/2013 | Funk | F16M 13/02 248/274.1 |
| 2014/0054426 A1* | 2/2014 | Burns | F16M 11/041 248/122.1 |
| 2014/0063750 A1 | 3/2014 | Mau et al. | |
| 2014/0116230 A1* | 5/2014 | Nakata | G10D 13/026 84/453 |
| 2014/0259532 A1 | 9/2014 | Millard et al. | |
| 2014/0328020 A1* | 11/2014 | Galant | F16M 11/105 361/679.56 |
| 2014/0346311 A1* | 11/2014 | Derman | H01R 13/46 248/551 |

OTHER PUBLICATIONS

"Ipad/Tablet Holding Products—Galaxy Tab Stand, Ipad Leg Strap, Nook Holder @ Hand e Holder", www.handholder.com, Mar. 15, 2013, four pages.
"HandyShell for iPad, iPad Cases & Covers/SpeckProducts", Mar. 15, 2013, two pages.
Detachable Metal Stand for iPad, Cell Phone, Smartphone, Tablet Accessories/iKross, Mar. 15, 2013, two pages.
"Life-Phorm All-in-One Positioning Device for iPad 3, iPad 4, Tablets, Smartphones and Cameras (000LIF)", Amazon.com: Life-Phorm All-in-One Positioning Device for iPad 3, iPad 4, Tablets, Smartphones and Cameras (000LIF): Computers & Accessories, Apr. 18, 2013, four pages.
"Stabile Coil PRO—Flexible Gooseneck Coil Based Pivoting iPad Stand—iPad 4g, 3g, iPad 2 and 1g", Stabile Coil PRO Flexible Gooseneck Coil Pivoting iPad 4g, 3g, iPad 2 and iPad Stand Holder, Apr. 18, 2013, four pages.
"Buzz / ZeroChromaZeroChroma", Mar. 15, 2013, twelve pages.

* cited by examiner

QUICK-RELEASE UNIVERSAL TABLET HOLDER FOR DESKTOPS AND FLOOR STANDS

CROSS-RELATED APPLICATIONS

This application is a continuation-in-part (CIP) of U.S. patent application Ser. No. 14/488,054, filed Sep. 16, 2014, and claims the benefit of U.S. patent application Ser. No. 14/255,711, filed Apr. 17, 2014, and claims the benefit of U.S. Provisional Application 61/878,491 filed Sep. 16, 2013, and U.S. Provisional Application 61/906,878 filed Nov. 20, 2013, all of which applications are incorporated by reference in their entireties.

FIELD

This invention relates to the interchangeable use and ergonomic positioning of personal information display devices among other applications and more particularly to display stands and holders that are particularly suited for viewing tablet computers both, while sitting down or lying down, to make such devices vastly more usable and enjoyable.

BACKGROUND OF THE INVENTION

Since the introduction of the Apple iPad in April 2010, the number of computing devices known as computer tablets, or "tablets" has vastly increased. These devices typically consist of a touch screen that fronts a highly sophisticated, versatile, thin, and lightweight computer.

As tablet devices increase in size, they may become in certain computing environments a more versatile alternative to dedicated desktop computers if a universal tablet holder can be made that is able to quickly and firmly hold and release tablets of any size and thickness with a simple and easily accessible mechanism without applying undue pressure on the tablet which may be damaging to the device.

Such a universal tablet holder may further enhance the functionality of tablet devices when mounted on a mobile floor stand enabling bed-ridden, ailing, elderly, as well as young and healthy individuals to enjoy the full range of benefits of their tablet devices while lying in bed or lounging on a chair.

A detailed analysis of a multitude of offerings from several manufacturers of tablets and tablet accessories revealed widespread availability of display or tablet holders that can be mounted on a desktop and a rather more limited availability of display and tablet holders that can be mounted on a floor stand. Most existing desktop stands and floor stands on the market today appear to be custom-tailored to accommodate a particular brand of tablets; typically an earlier or a current version of the Apple iPad. A few tablet holders were found that could accommodate tablets or display panels of varying sizes and thicknesses but none appear to have been designed with a simple and elegant hold and release mechanism that would enable a computer tablet to instantly transform from a tablet device into a traditional style desktop computer or into a highly versatile floor-mounted interactive display stand and back to a hand held computing device with ease and elegance.

For example, the Levo G1 Tablet Platform Kit can secure tablets of varying sizes and thicknesses to a perforated grill sheet/platform by using four adjustable bungees (nylon-based rubber bands) that can lay across each corner of a tablet and secure it to the perforated grill sheet by extending through the holes of the sheet (www.levostore.come). This brand of floor-mounted tablet holder is sold at several popular retailers such as Amazon, Walmart, and Brookstone. While this brand can accommodate tablets of varying sizes and thicknesses, getting a tablet in and out of the bungee cords is somewhat cumbersome. Furthermore, mounting tablets of noticeably different sizes on the same platform (such as an iPad Air instead of and iPad mini) would necessitate the removal and reinsertion of each bungee cord into the perforated platform to accommodate the new tablet's dimensions.

The Symmetry Office iPad Adjustable Stand, the SIIG Headrest Car Mount for iPad, and the Pyle Home PSPAD05 Universal Wall Mount Tablet iPad Holder, all feature retractable and adjustable arms that can accommodate tablets of various sizes and thicknesses, but as their names indicate, they are single purpose tablet holders by design, and do not feature a simple and elegant hold and release mechanism, making them unsuitable for use as interchangeable tablet holders.

While other vendors exist that offer adjustable arms that can "hug" tablets of various sizes and thicknesses, a detailed analysis of current offerings revealed that none of these products provide a simple, easily accessible, and quick hold and release mechanism that enables users to firmly mount and release tablets of various shapes, weights, and sizes with speed and elegance.

Therefore, a need exists for a simple and elegant universal tablet holder that can instantly transform the form and function of most electronic tablet devices to assume the roles of a desktop computer, a mobile and versatile floor-mounted display panel, as well as other useful computational embodiments, with added functionality and ergonomics.

SUMMARY OF THE INVENTION

There is a long felt need for an integrated mechanical device for the interchangeable, quick, and efficient positioning and use of tablet computers for optimal user input and viewing experience while sitting down as well as while lying down. Such a device would enable tablet computers to assume the form and function of a desktop computer as well as a highly versatile and mobile floor-mounted interactive display stand. A mobile floor-mounted interactive display stand may be highly useful to bed-ridden, ailing, and elderly people and may serve as a relaxation device for people lounging on a chair, sofa, or bed. It may also serve other useful computational embodiments such as, for example, enabling a computer tablet to be used as a teleprompter.

A quick-release universal tablet holder has been conceived that includes four moving brackets for framing computer tablets of variable sizes and shapes. Each bracket consists of an L-shaped ledge mounted on a moving arms which can slide vertically and horizontal within four cross-shaped channels carved out of a mounting plate. The sliding arms allow for the quick cradling of tablet devices of varying sizes by sliding up and down the carved channels to fit the exact length and width dimensions of the tablet being cradled. The L-shaped ledges are mounted on the sliding arms through a load bearing hinge which can be rotationally locked at multiple specific angles with the manipulation (e.g., press or pull and release) of a button or other control—with an option for a default angular position.

In one non-limiting example, pressing a button on either end of the hinge would enable the L-shaped ledge to quickly pivot to a default "open" position where the larger surface of the L-shaped ledge may swing backward from about 45 degrees to about 90 degrees from the surface of the sliding arm on which it is mounted, allowing a tablet computer to be inserted into, or slid out of, the grasp of a 4-armed universal tablet holder.

Securing a tablet in a Universal Tablet Holder is accomplished by inserting the tablet into the Universal Tablet Holder, pressing the button of the load bearing hinge and keeping it depressed while the user pivots the "open" L-shaped ledge position into a "closed" L-shaped ledge position by manually swinging back the "L-shaped ledge into a position that may swing forward from about 90 degrees to about 135 degrees from the surface of the sliding arm on which it is mounted.

The L-shaped ledge may be made to swing forward at an angle that is steeper than 90 degrees from the surface of the sliding arm on which it is mounted by slanting the inner side of the edge of the sliding arms in a way that would allow the L-shaped ledge to move further down to secure tablets that may be thinner than the thickness of the L-shaped ledge, thereby eliminating any wobbling that would have occurred if the tablet that was being secured was thinner than the width of the L-shaped ledge, and the L-shaped ledge were to be made to secure tablets only at a default 90 degree angle from the sliding arm on which it is mounted.

The above described mechanism enables the Universal Tablet Holder to quickly and easily hold and release computer tablets of varying sizes and thicknesses with firmness and elegance without compressing the display panel.

In one implementation, the quick-release universal tablet holder may be attached to a desktop stand through a ball and socket mechanism to enable a tablet computer to assume the form and function of a desktop computer.

In another implementation, the quick-release universal tablet holder may be attached to a floor stand through a ball and socket mechanism to enable a tablet computer to assume the form and function of a highly versatile and mobile floor-mounted interactive display stand.

The use of a single tablet to replace and enhance the usability of a number of electronic devices will not only result in lower costs to the consumer, it will result in the elimination of the need to spend substantial time learning to operate multiple redundant devices that take up valuable space and require valuable resources to manufacture and to support.

Features of the quick-release universal table holder may include:

Brackets: a locking mechanism of the brackets includes knobs that are manually twisted to lock that relies on manual twisting of knobs to fix the position of the sliding arms in a bracket enclosure. The knob includes a threaded shaft. As the knob is screwed into a threaded opening of the sliding arm, the knob binds against a surface in the bracket enclosure which causes the flanges of the sliding arm to bind to surfaces of the bracket enclosure. The binding locks the sliding arm in the bracket and prevents relative movement between the sliding arm and the bracket. A handle on the knob allows a user to twist the threaded shaft to bind and unbind the sliding arm to the bracket enclosure. The user can select any relative position between the sliding arm and the bracket enclosure with the locking mechanism. While locking mechanisms—such as ratcheting mechanisms—may be employed, these and other locking mechanisms may result in some wobbling in holding tablets that do not fit exactly within the specific incremental spacing of ratcheted notches and holes.

A quick lock and release mechanism: A rotation lock mechanism may be used in combination with slanted edges of the inner side of the sliding arms to provide a wide range of angles through which the ledges, stems, panels and bases may pivot with respect to each other. The rotation lock fixes the angular position between such components after the user selects the angular position. The rotation lock mechanism provides for a solid fit in holding tablets of any thickness without any wobbling. The rotation lock mechanism also does not put excessive pressure on the display tablet and allows for quick locking and releasing of the tablet with a simple push of a button. Further, a default position of the rotation lock mechanism may be used to set a commonly used default "open" angular position between the swiveling ledges at the ends of each of the sliding arms of the Quick Release Universal Tablet Holder and the surface of the sliding arm on which it is mounted. Pressing a button on either end of the hinge would enable the L-shaped ledge to quickly pivot to a default "open" position where the larger surface of the L-shaped ledge may swing backward from about 45 degrees to about 90 degrees from the surface of the sliding arm on which it is mounted, allowing a tablet computer to be inserted into, or slid out of, the grasp of a 4-armed universal tablet holder unfettered. This default position may be achieved with a simple push of the button on one or more of the quick lock and release mechanisms.

Ball and socket: A releasable ball and socket mechanism allows for quick attachment and separation of the universal tablet holder and a desktop holder or a floor stand. The ball and socket mechanism also allows a single tablet holder to be used with a desktop holder, floor stand and any other support device having a ball that fits into the socket.

A tablet holder has been conceived and is disclosed comprising: a mounting plate including a back surface with a coupling for a support device and a front surface with slots configured to receive arms; the arms are slidably mounted in the slots and each includes an end extending outward from the mounting plate; a locking mechanism releasably securing each of the arms to the mounting plate, and for each arm, a swiveling ledge connected by a locking hinge to the end of the arm, wherein the hinge includes a releasable locking mechanism.

The locking hinge may include a shaft having a locking region with faceted sides, wherein the locking region engages locking chambers in each of the arm and the swiveling ledge and the locking region slides out of the locking chambers as the user presses on the locking hinge. The arms may include a first pair of arms and a second pair of arms perpendicular to the first pair of arms. Each arm may include a center ridge and flanges on opposite sides of the center ridge, wherein the flanges engage channels within the respective slot of the mounting plate. The hinge may include a default position at which the hinge is biased and sets a default angular position between the swiveling ledge and the arm. The locking mechanism may include for each arm a threaded shaft with at one end a knob and a threaded opening in the arm to receive an opposite end of the threaded shaft.

A tablet holder has been conceived comprising: a mounting plate including a back surface with a coupling for a support device and a front surface with a first slot configured to receive a first arm; the first arm includes a beam and an end, wherein the beam has a cross section matching a cross section of the slot such that the beam slides into the slot and the end is attached to a locking hinge; a locking mechanism releasably secures the first arm to the mounting plate to prevent sliding of the beam in the slot, and a swiveling ledge connected the locking hinge to the end of the first arm, wherein the hinge includes a releasable locking mechanism.

A tablet holder has been conceived and is disclosed that includes: a mounting plate including a back surface with a coupling for a support device and a front surface with a first and second slot aligned along a first line, and a third and fourth slot aligned along a second line perpendicular to the first line, wherein each of the first, second, third and fourth slots have cross sections with opposing channels and an open gap to the front surface; the first, second, third and fourth arms each including a beam having a cross section configured to slide into a respective one of the first, second, third and fourth slots; a locking mechanism for each of the arms that releasably secures the arm to the mounting plate to prevent sliding of the beam in the slot, and a swiveling ledge connected to a locking hinge at an end of each of the arms, wherein the hinge includes a releasable locking mechanism, wherein the swiveling ledges on each of the first, second, third and fourth arms are in a plane.

DETAILED DESCRIPTION

Embodiments are directed to an integrated mechanical device for the interchangeable, quick, and efficient positioning and use of tablet computers for optimal user input and viewing experience while sitting down as well as while lying down.

The following figures illustrate the mechanics of an exemplary universal tablet holder. The displayed embodiments are shown for exemplary purposes; the various parts shown in the provided illustrations, such as gears, shafts, hinges, openings, springs, buttons, plates, and ledges can have various shapes and sizes to fit the desired form and function of the device in which they are integrated.

Figure 1:
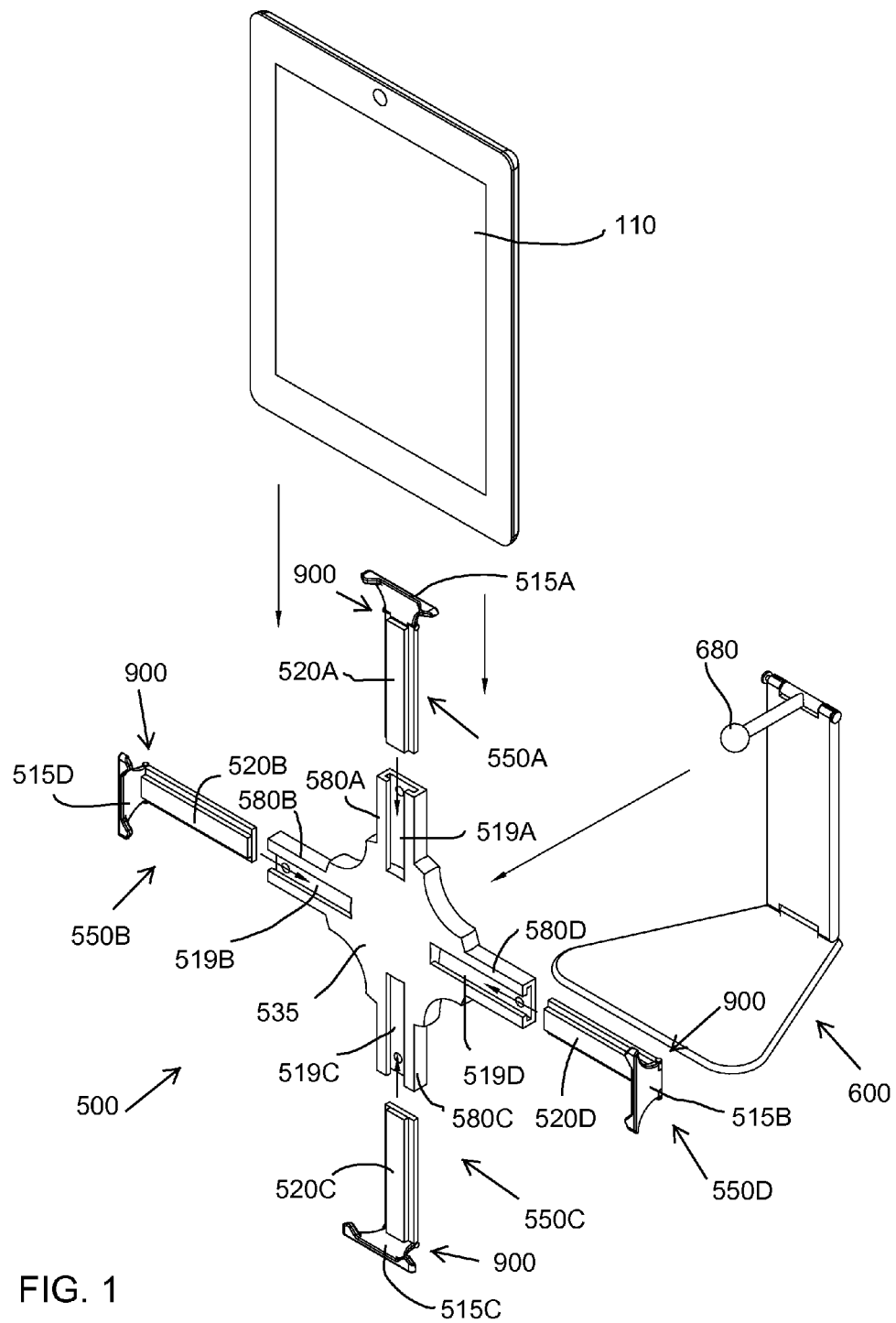
FIG. 1 illustrates a three-dimensional perspective exploded view of the components of a quick-release universal tablet holder and the perspective view of a complementary desktop stand and how the individual components of the quick-release universal tablet holder fit together to hold an electronic tablet.

FIG. 1 illustrates a three-dimensional perspective exploded view of the components of a quick-release universal tablet holder 500 and the perspective view of a complementary desktop stand 600 and how the individual components of the universal tablet holder fit together to hold a computer tablet 110.

The quick release universal tablet holder 500 consists of a mounting plate 535 with four carved channels 519A, 519B, 519C, and 519D. Inside the channels slide four brackets 550A, 550B, 550C and 550D. Each bracket is made up of a "T" shaped sliding arm 520, a Rotation Lock Mechanism with default positioning 900 (as cross-referenced in U.S. patent application Ser. No. 14/488,054, filed Sep. 16, 2014) and a swiveling Ledge 515. The quick release universal tablet holder 500 securely holds a tablet by sliding the "T" shaped arm of each of its brackets 520A, 520B, 520C, and 520D to match the length and the width of the tablet it is enclosing.

The brackets are secured in place with four threaded screws that fit into four threaded holes 560A, 560B, 560C, and 560D at the back of each bracket enclosure 580A, 580B, 580C, and 580D. Alternatively, the threaded screws may be replaced by pins that engage holes in the channels, a cantilevered finger that engages ridges in the channels or other detent structure that securely and releasably holds the sliding arms 520 in the channels of the mounting plate.

A tablet 110 is quickly held and released by the universal tablet holder 500 by pressing the button of an attached Rotation Lock Mechanism 900 located at the junction of each bracket to change the rotational position of the swiveling ledge 515 with respect to the sliding arm 520 thereby either securing the tablet by pivoting the swiveling ledge 515 forward, towards the tablet, to a "closed" position, or unlocking the tablet by swiveling the ledge 515 away from it to an "open" position. Pressing the button of a Rotation Lock Mechanism with default positioning 900 may instantly swivel the holding ledge 515 away from the tablet to a wide open default position which would allow the tablet to be easily pulled out of the remaining brackets.

Figure 2:
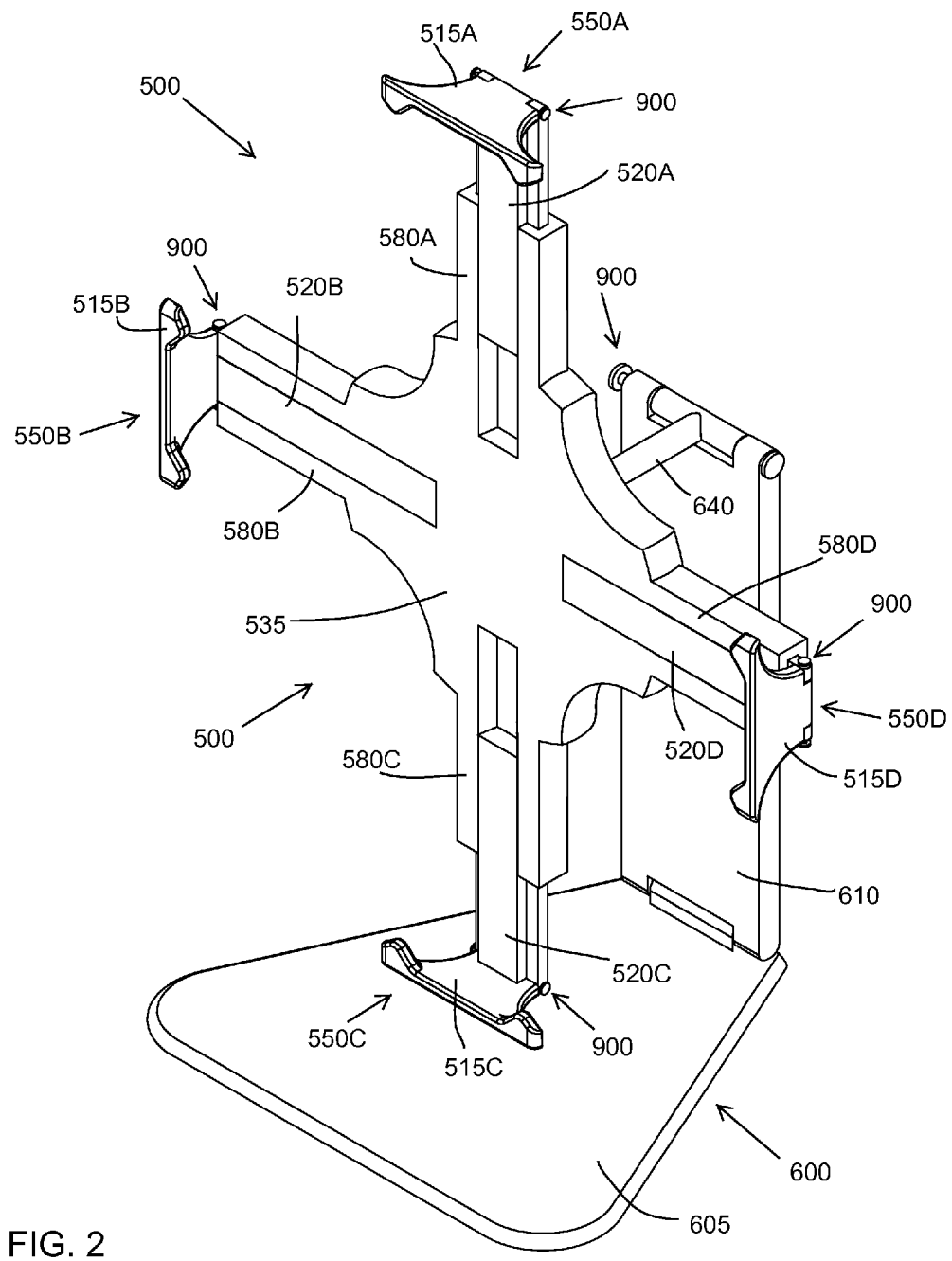
FIG. 2 illustrates a perspective three-dimensional front view of an assembled quick-release universal tablet holder mounted on a desktop stand.

FIG. 2 illustrates a three-dimensional front perspective view of an assembled quick-release universal tablet holder 500 attached to a complementary desktop stand 600 and how the individual components of the universal tablet holder 500 fit together to hold an electronic tablet.

The sliding arms 520 slide in the channels 519 to adjust the span between opposite brackets 550B and 550D, and 550A and 550C. The span between opposite is adjusted to conform to the width and height of the tablet. The swiveling ledge pivot from an open position, as shown in FIG. 1, towards a right angle folded position as shown in FIG. 2. The user pivots the swiveling ledge to engage the edges of the tablet and support the tablet. The angle formed between the swiveling ledge and the sliding arms is selected by the user and may be selected to form a snug fit between the universal tablet holder and the swiveling ledges.

Figure 3:
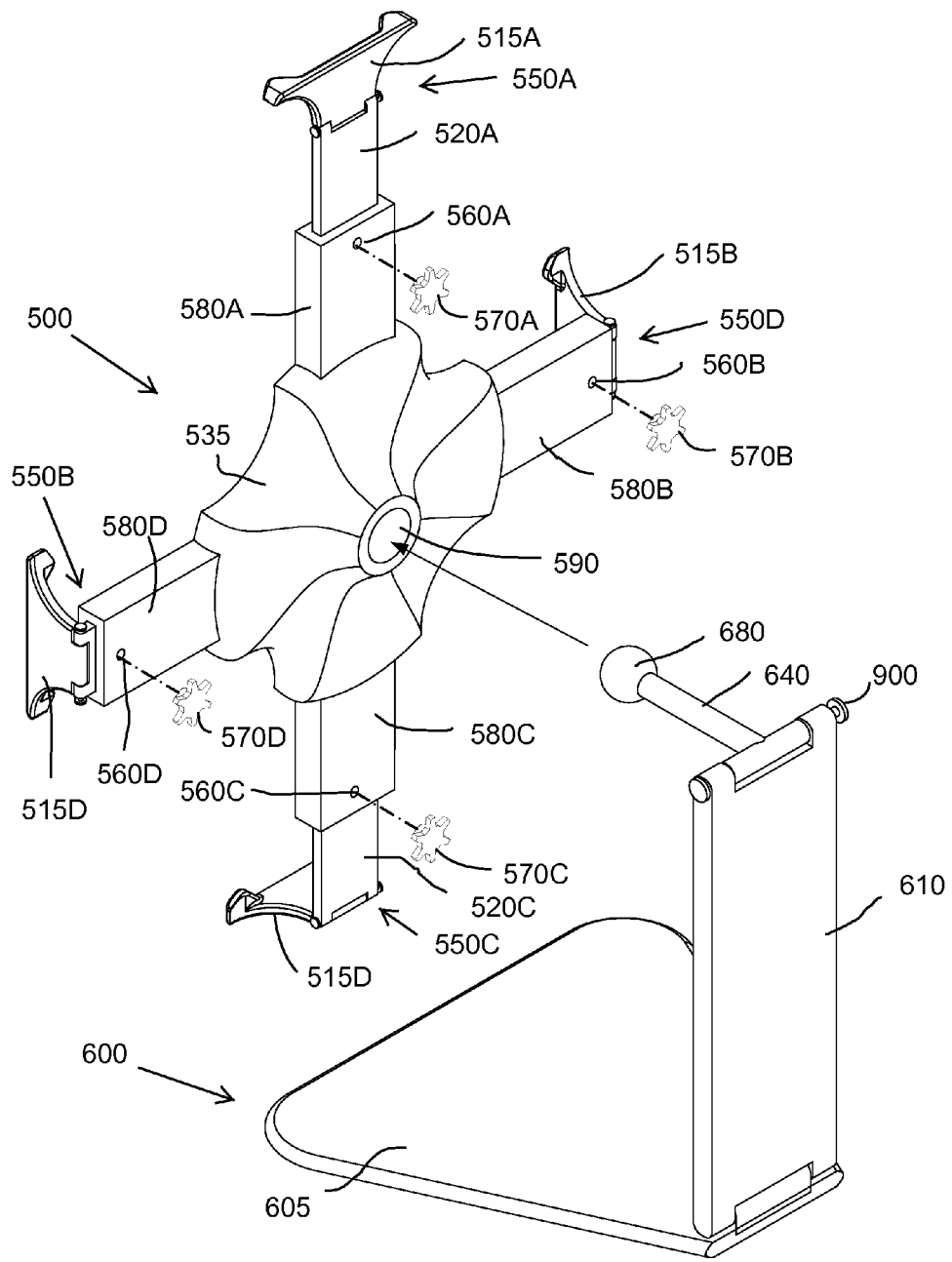
FIG. 3 illustrates a perspective three-dimensional rear view of how the arms of a quick release universal tablet holder are locked into position and how the quick-release universal tablet holder may be mounted on a desktop stand.

FIG. 3 illustrates a three-dimensional rear perspective view of how the arms of a quick release universal tablet holder are locked into position by tightening threaded knobs (not screws) 570A, 570B, 570C, and 570D through threaded holes 560A, 560B, 560C, and 560D and locking the position of the sliding arms 520A, 520B, 520C, and 520D within the bracket enclosures 580A, 580B, 580C, and 580D.

The universal tablet holder 500 is supported by the desktop stand 600 by a ball 680 that fits into a semi-spherical recess 590 in the back of the holder 500. The ball and semi-spherical recess form a slidable engagement that allows the holder to pivot about the ball in a wide range of directions. A friction fit between the ball and semi-spherical recess holds the holder 500 in a fixed position with respect to the stand 600. A user can move the position of the holder by causing the ball to slide in the semi-spherical recess.

Figure 15:
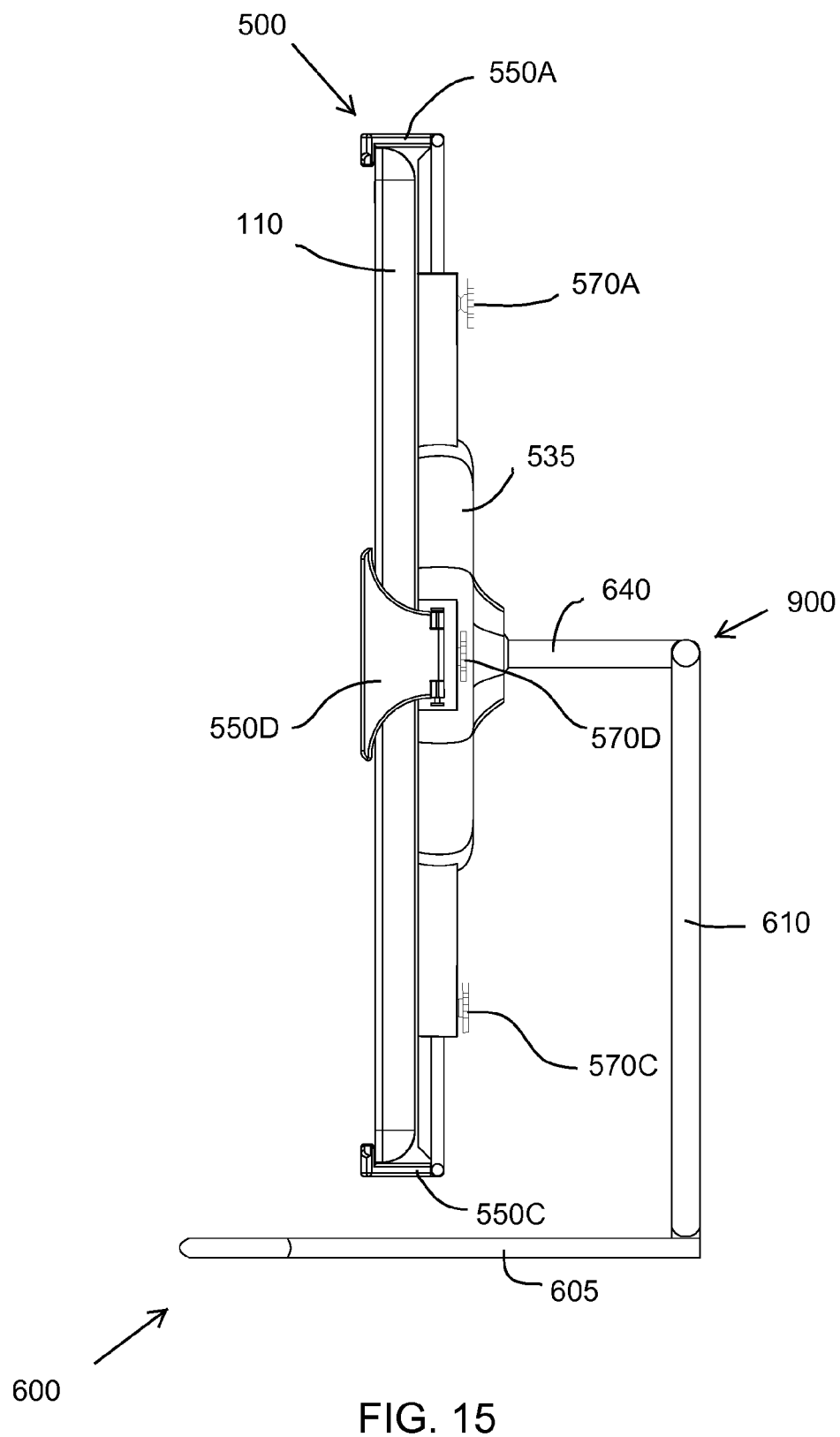
FIG. 15 illustrates a cross-sectional side view of a tablet computer seated in a quick-release universal tablet holder mounted on a desktop stand.

The ball 680 is fixed to a stem 640 that is attached to an upright panel 610 (FIG. 15). The attachment may be a locking hinge that allows the angle between the stem and panel to be selected and set by a user. The panel 610 is supported by a base 605 (FIG. 15) which sits on a table or other surface. The base may have a flat bottom, wheels, deformable bean bag or other bottom surface configured to hold the tablet, holder 500 and stand 600 in a fixed and steady position. A locking hinge between the panel 610 and base may be used to allow a user to select and set an angle between the panel and base.

Figure 4:
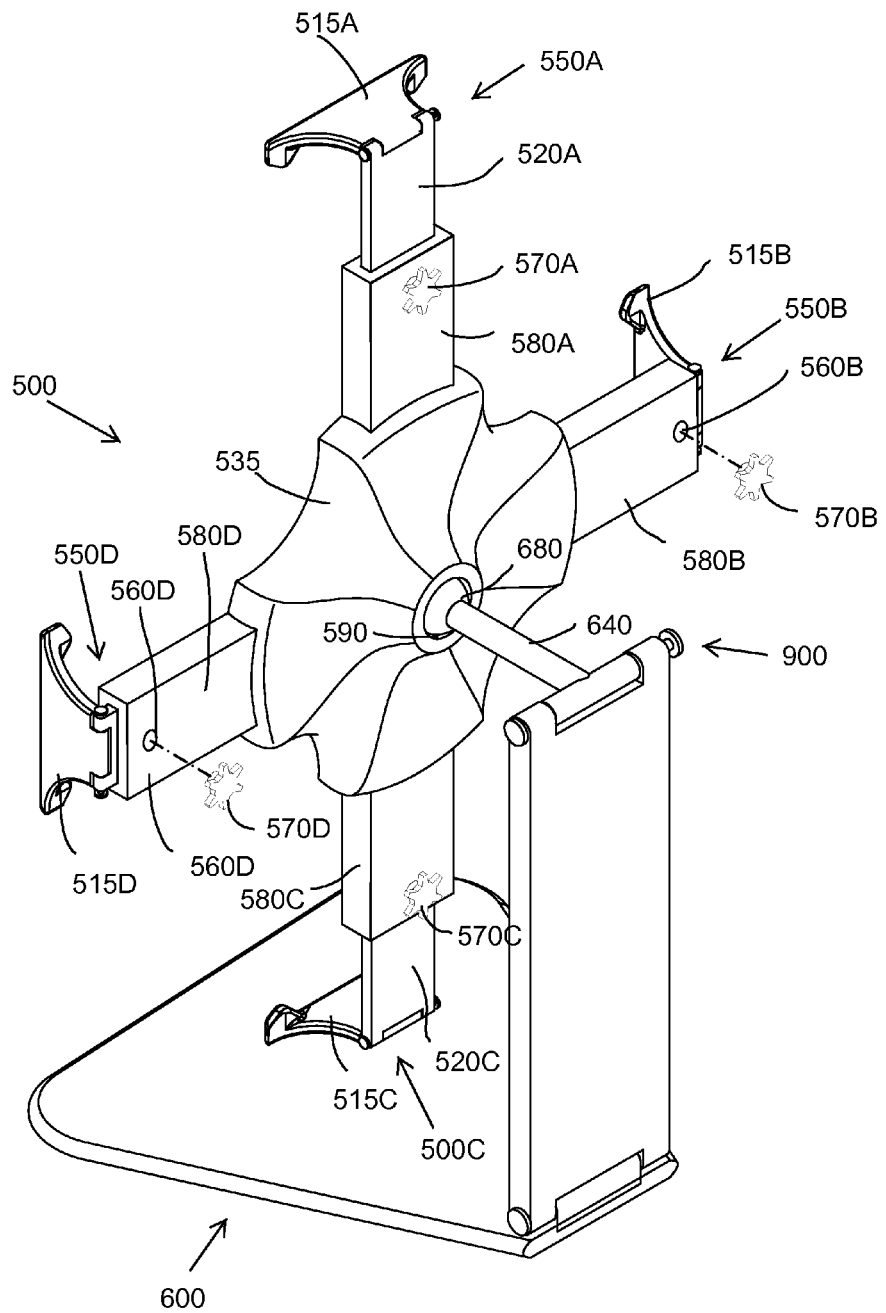
FIG. 4 illustrates a three-dimensional back perspective view of a quick-release universal tablet holder mounted on a desktop stand.

FIG. 4 illustrates a three-dimensional rear perspective view of an assembled quick-release universal tablet holder 500 attached to a complementary desktop stand 600 and how the quick release universal tablet holder 500 may be mounted on a desktop stand 600 through the use of a ball 680 and socket 590 mechanism.

Figure 5:
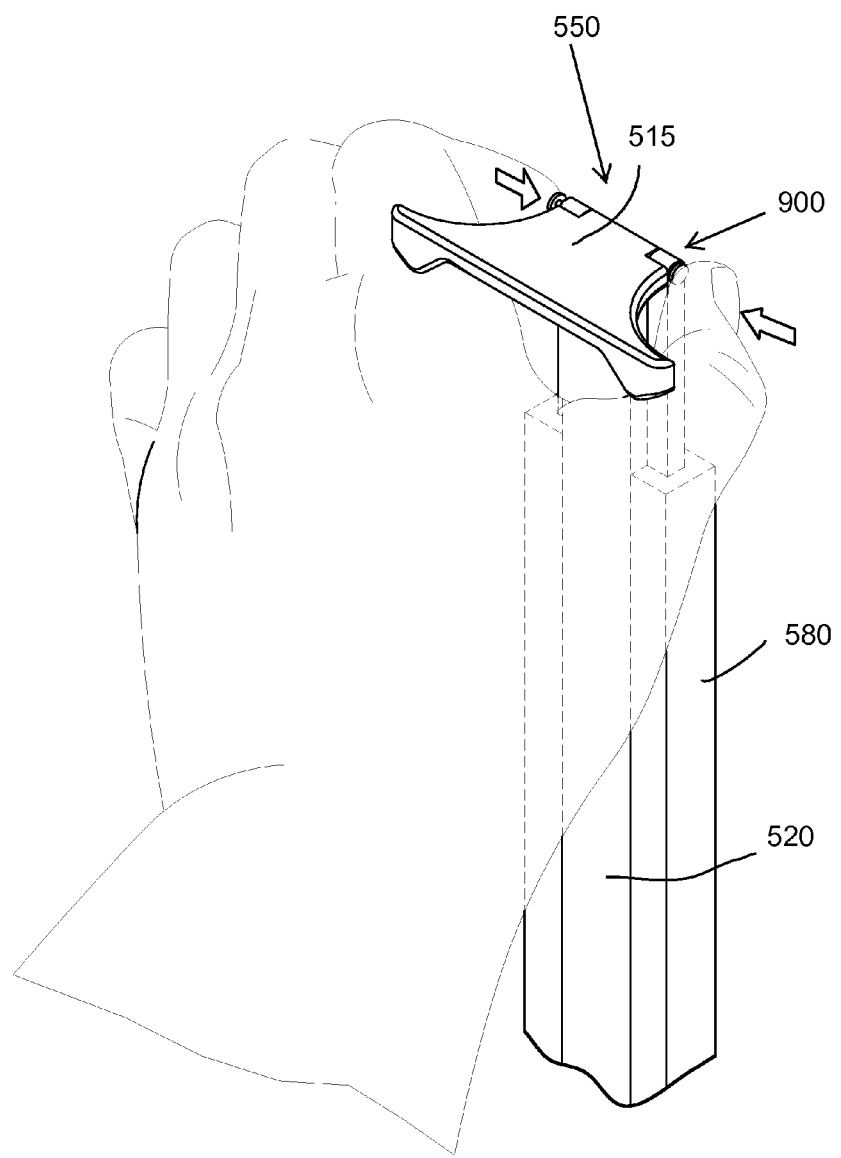
FIG. 5 illustrates a perspective view of how a user's hand can be positioned to unlock a ledge of the quick-release universal tablet holder in order to free a tablet computer from the clutches of the universal tablet holder.

FIG. 5 illustrates a perspective view of how a user's hand can be positioned to press on the rotation lock mechanism 900 of a sliding bracket 550 to unlock the ledge 515 of the sliding bracket 550 in order to free a tablet computer 110 from the clutches of the universal tablet holder 500. The thumb and forefinger press the ends of the hinge between the ledge 515 and sliding bracket 550. The hinge includes a rotation lock mechanism 900 that enables the user to lock the ledge at any of a variety of angles with respect to the sliding bracket. By pressing the rotation lock mechanism the user releases the mechanism to allow the ledge to rotate about the sliding bracket. By releasing the rotation lock mechanism, the user fixes the angular position between the ledge 515 and the sliding bracket 550.

Figure 6:
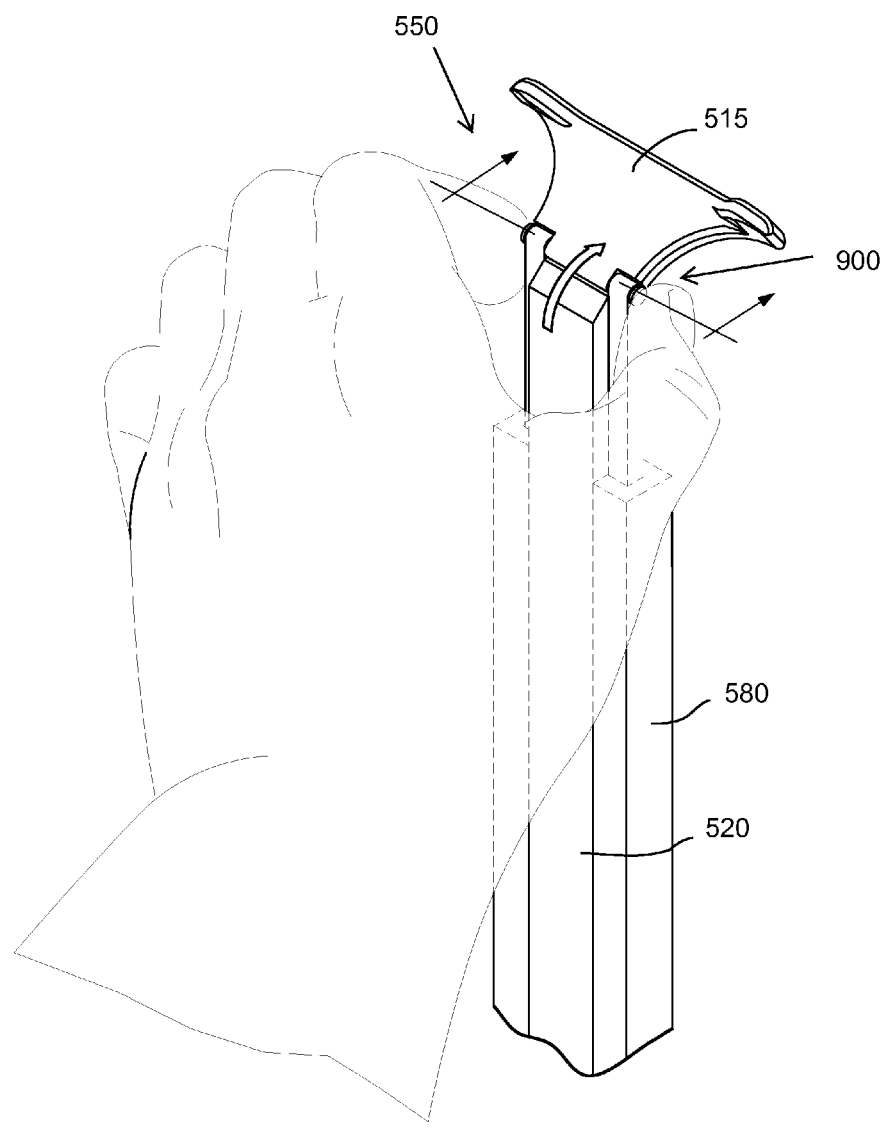
FIG. 6 illustrates a perspective view of how a ledge of the quick-release universal tablet holder reacts to the press of the button of its associated rotation lock mechanism.

FIG. 6 illustrates a perspective view of the rotation of the ledge 515 about the sliding bracket 550 when the user presses a button on the end of the rotation lock mechanism 900.

Figure 7:
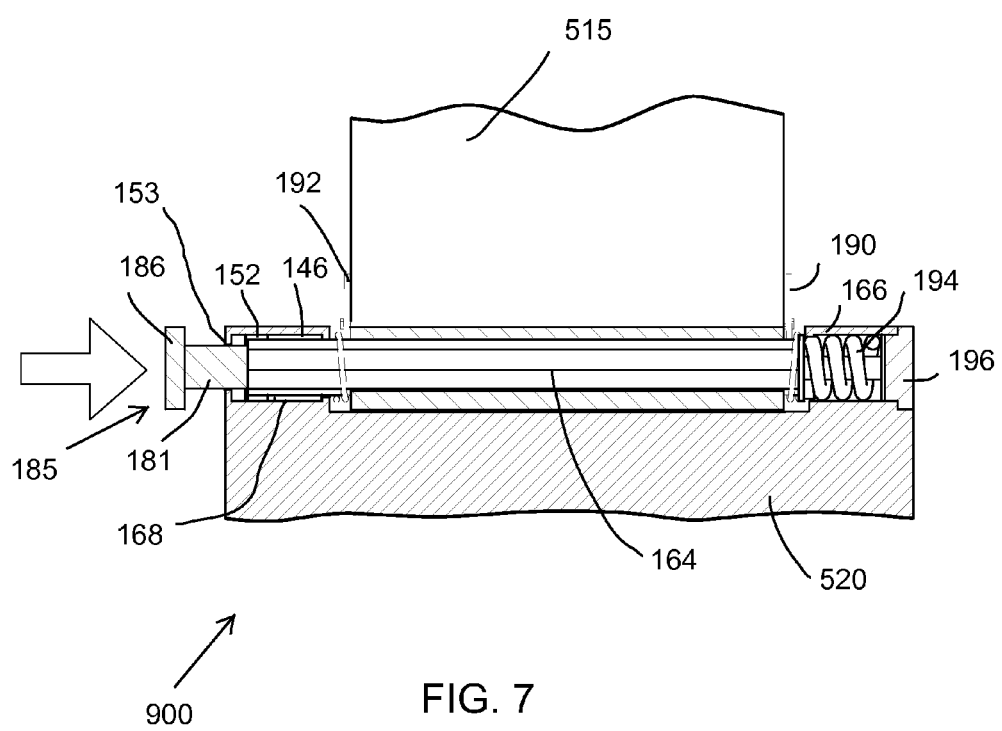
FIG. 7 illustrates a cross sectional view of an embodiment of a rotation lock mechanism for a quick-release universal tablet holder which can lock the ledge of a sliding arm to various angles with the press and release of its button.

FIG. 7 illustrates a cross sectional view of an embodiment of a rotation lock mechanism 900 for a quick-release universal tablet holder 500 which can lock the ledge 515 of a sliding arm 520 to various angles with the press and release of its button.

The detailed mechanics of the functioning of a rotation lock mechanism 900 are cross-referenced in U.S. patent application Ser. No. 14/488,054, filed Sep. 16, 2014, which are incorporated by reference. The non-limiting embodiment shown in FIG. 7 shows a spring 194 disposed in a chamber 166 in the right side of the rotation lock mechanism 900 pushing an exemplary octagonal shaft 164 into an exemplary two-chambered socket 168; one chamber 152 located at the at the left edge of the two-chambered socket 168 contains a reverse octagonal socket that will lock the angular position of the octagonal shaft 164 in place when the shaft 164 is pushed into the chamber by the opposing spring 194. This position is the default position of the rotation lock mechanism 900. The other chamber 146 has a smooth cylindrical surface that will allow the octagonal shaft 164 to rotate freely on its axis. The figure also shows a circular opening 153 at the left edge of the two-chambered socket 168 of the rotation lock mechanism 900 into which a structure such as a push button can be inserted. The push button 185; consisting of a button cap 186 and a plunger 181, can be used to disengage the exemplary octagonal shaft 164 out of the reverse octagonal socket 152 and into the smooth cylindrical surface chamber 146 by compressing the spring 194, and freeing the ledge 515 to freely pivot around its axis.

Another feature of the rotation lock mechanism 900 is the pair of default position springs 190 and 192. The optional springs 190 and 192 provide the rotation lock mechanism 900 with a default position when the button cap 185 is pressed. The optional springs 190 and 192, which may consist of one or more loops, loop around the shaft 164 and attach, from one side to pin fasteners located on either side of the pivoting ledge 515 and from the other side, they can attach into holes drilled into the middle of the side of the sliding arm 520.

Figure 8:
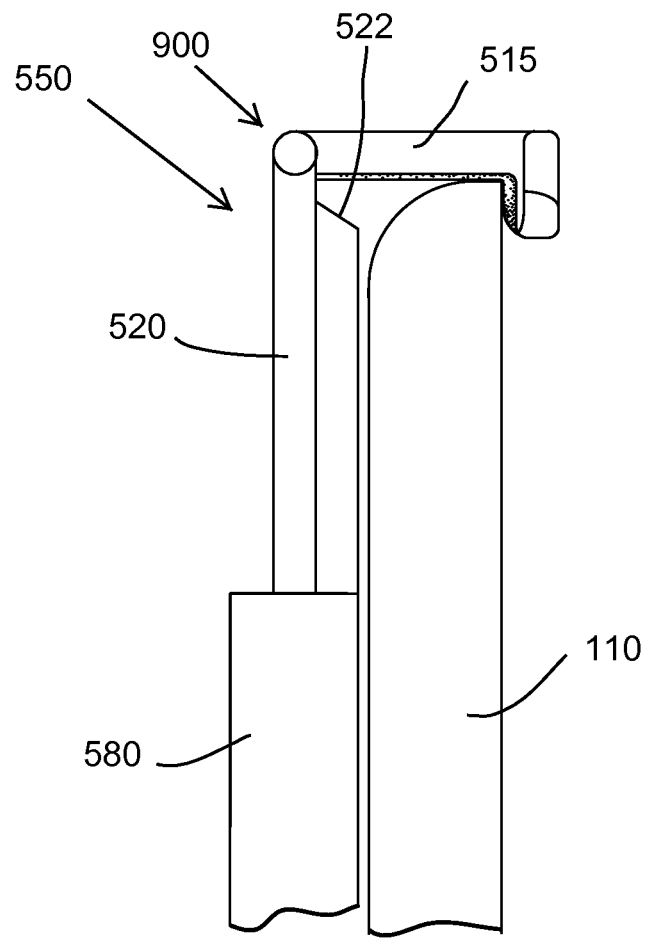
FIG. 8 illustrates a cross sectional view of a tablet of a particular shape and thickness being secured by a sliding arm of a quick-release universal tablet holder.

FIG. 8 illustrates a cross sectional view of a tablet 110 of a particular shape and thickness being secured by a sliding bracket 550 of a quick-release universal tablet holder 500. FIG. 8 shows how the ledge 515 may be pivoted to engage the edge of a tablet. A ridge 522 of the sliding arm 520 provides a support for the back panel of the tablet. The end of the ridge 522 may be beveled to allow for a greater range of angles about which the ledge 515 may pivot.

Figure 9:
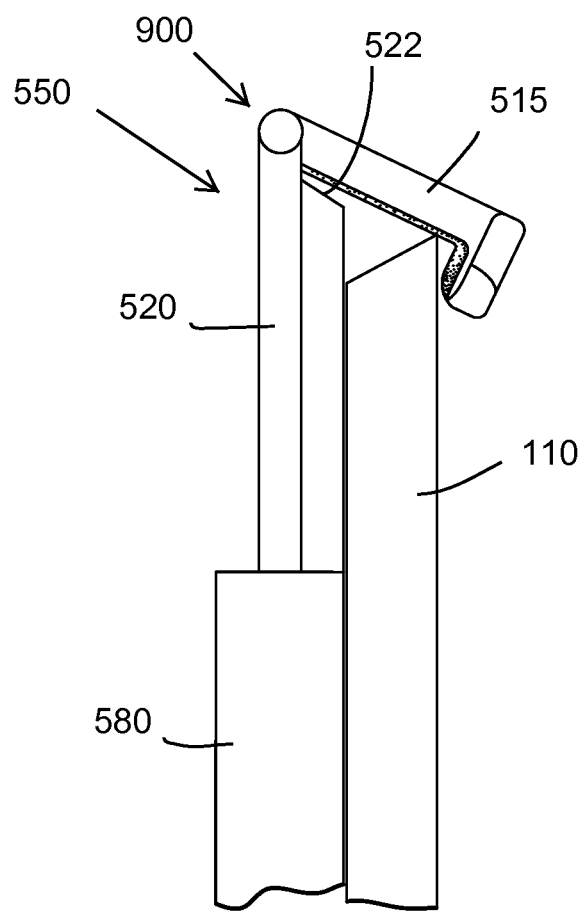
FIG. 9 illustrates a cross sectional view of another tablet of a different shape and a lesser thickness being secured by a sliding arm of a quick-release universal tablet holder.

FIG. 9 illustrates a cross sectional view of another tablet 110 of a different shape and a lesser thickness being secured by a sliding bracket 550 of a quick-release universal tablet holder 500.

Figure 10:
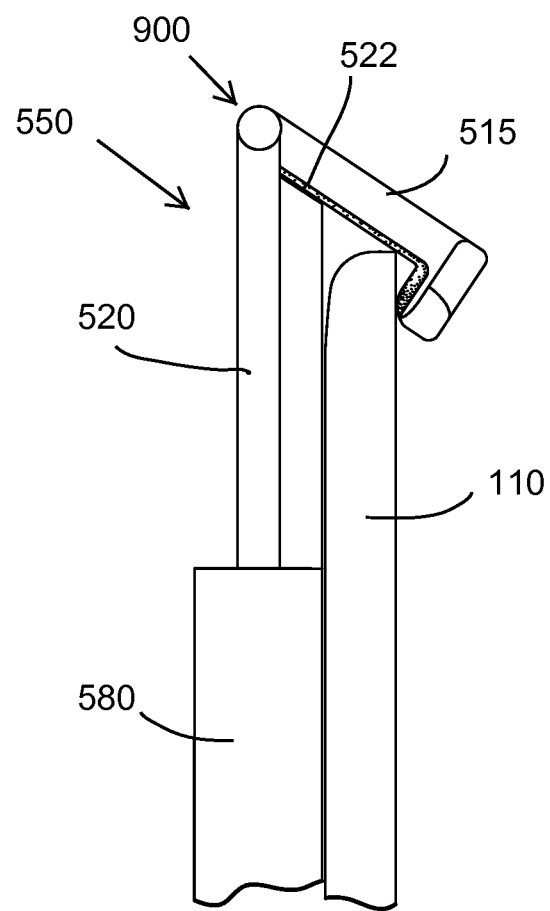
FIG. 10 illustrates a cross sectional view of a yet another tablet of a different shape and even slimmer profile being secured by a sliding arm of a quick-release universal tablet holder.

FIG. 10 illustrates a cross sectional view of a yet another tablet 110 of a different shape and even slimmer profile being secured by a sliding bracket 550 of a quick-release universal tablet holder 500. The ledge 515 is shown in FIG. 10 at a maximum pivot angle such that the ledge abuts the beveled end of the ridge 522 on the sliding arm 520. The interior surface of the ledge 515 may have a soft, ductile surface to grip the edge of the tablet.

Figure 11:
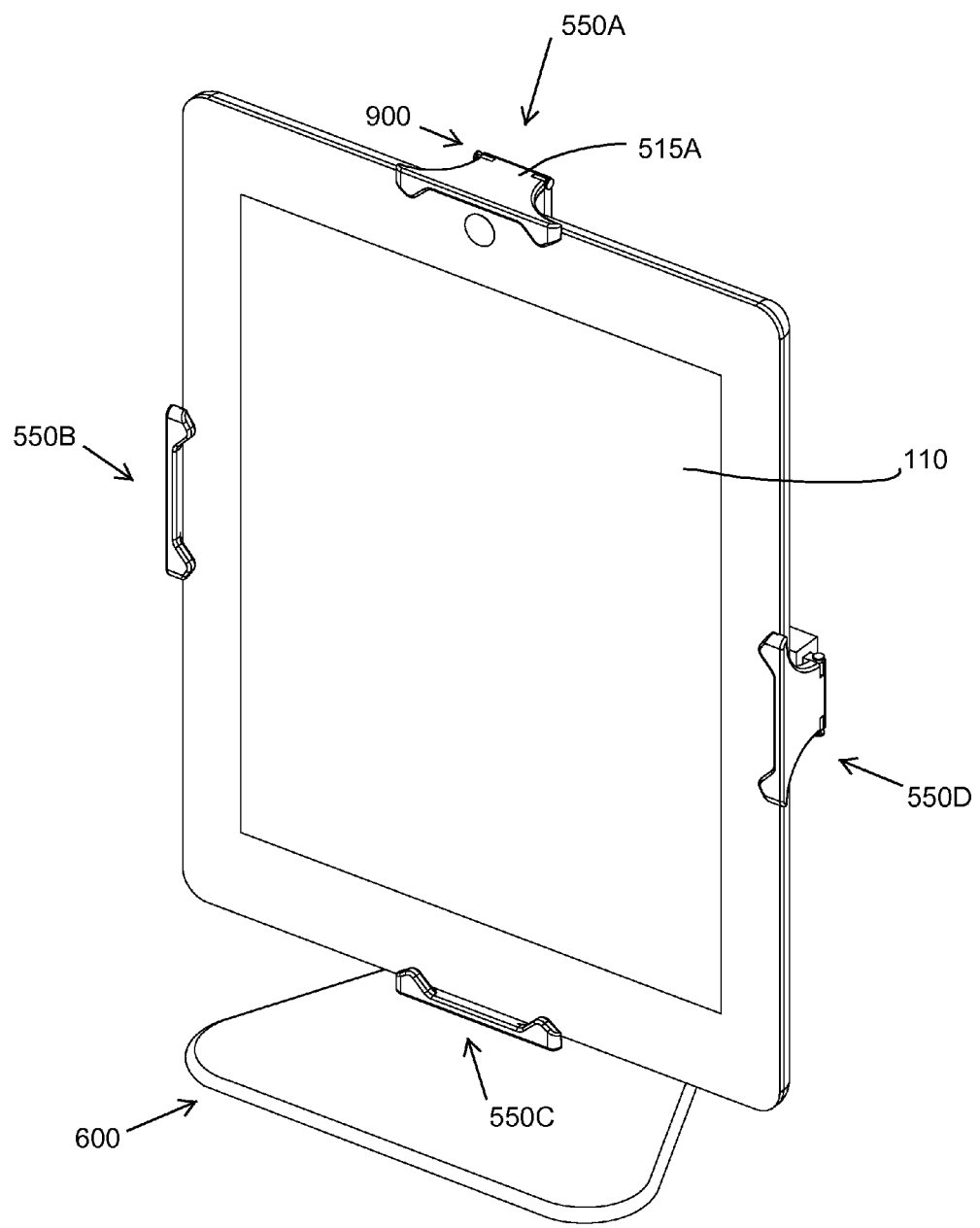
FIG. 11 illustrates a three-dimensional front perspective view of a tablet computer seated in a quick-release universal tablet holder coupled to a desktop stand with the top ledge of the universal tablet holder in the secure "closed" position.

FIG. 11 illustrates a three-dimensional front perspective view of a tablet computer 110 seated in a quick-release universal tablet holder 500 coupled to a desktop stand 600 with the top ledge of the universal tablet holder 515A in the secure "closed" position.

Figure 12:
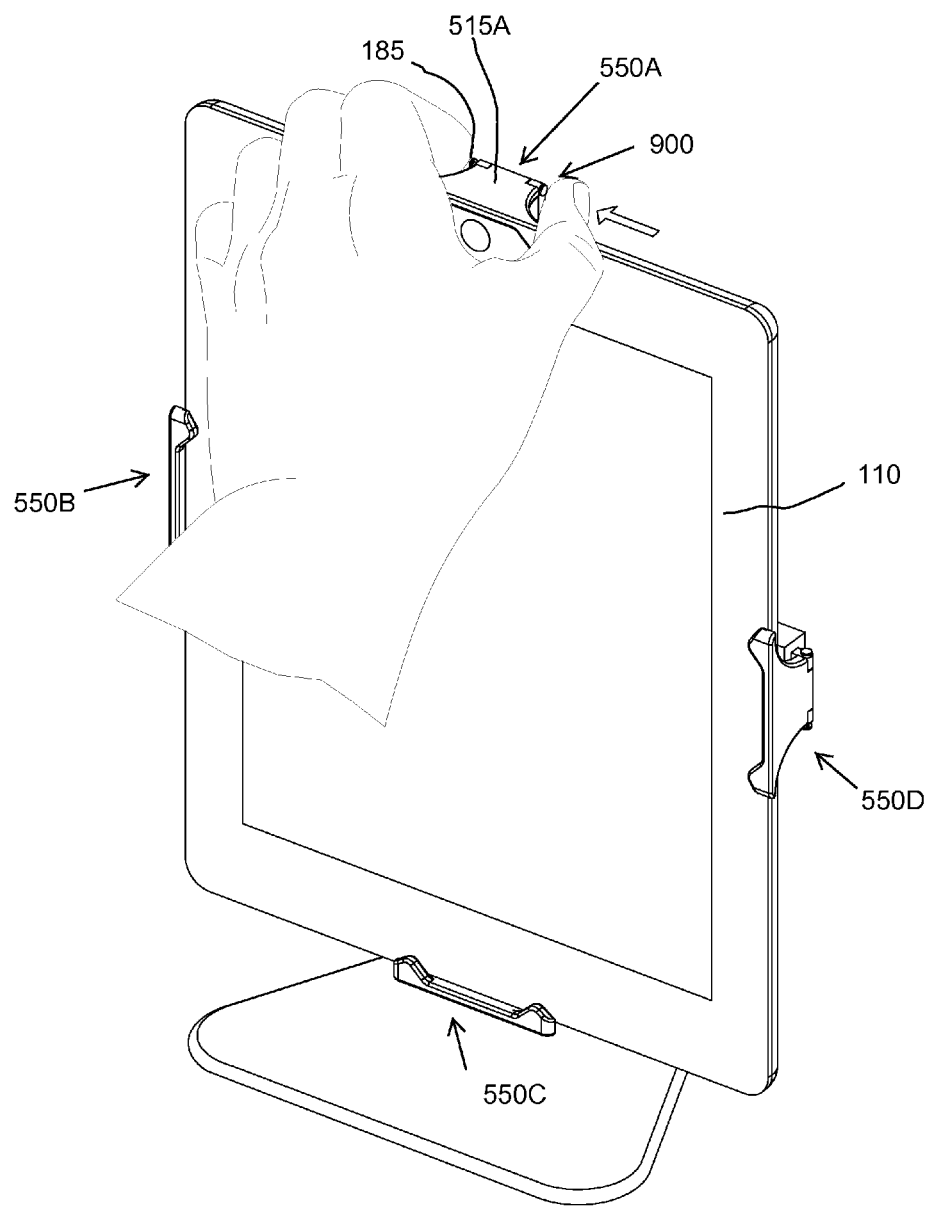
FIG. 12 illustrates a three-dimensional front perspective view of how a user can press the button of a rotation lock mechanism associated with one of the ledges of the quick-release rotation lock mechanism in order to free a tablet computer from the clutches of the universal tablet holder.

FIG. 12 illustrates a three-dimensional front perspective view of how a user can press the button 185 of a rotation lock mechanism 900 associated with one of the ledges of the quick-release rotation lock mechanism 515A in order to free a tablet computer 110 from the clutches of the universal tablet holder 500.

Figure 13:
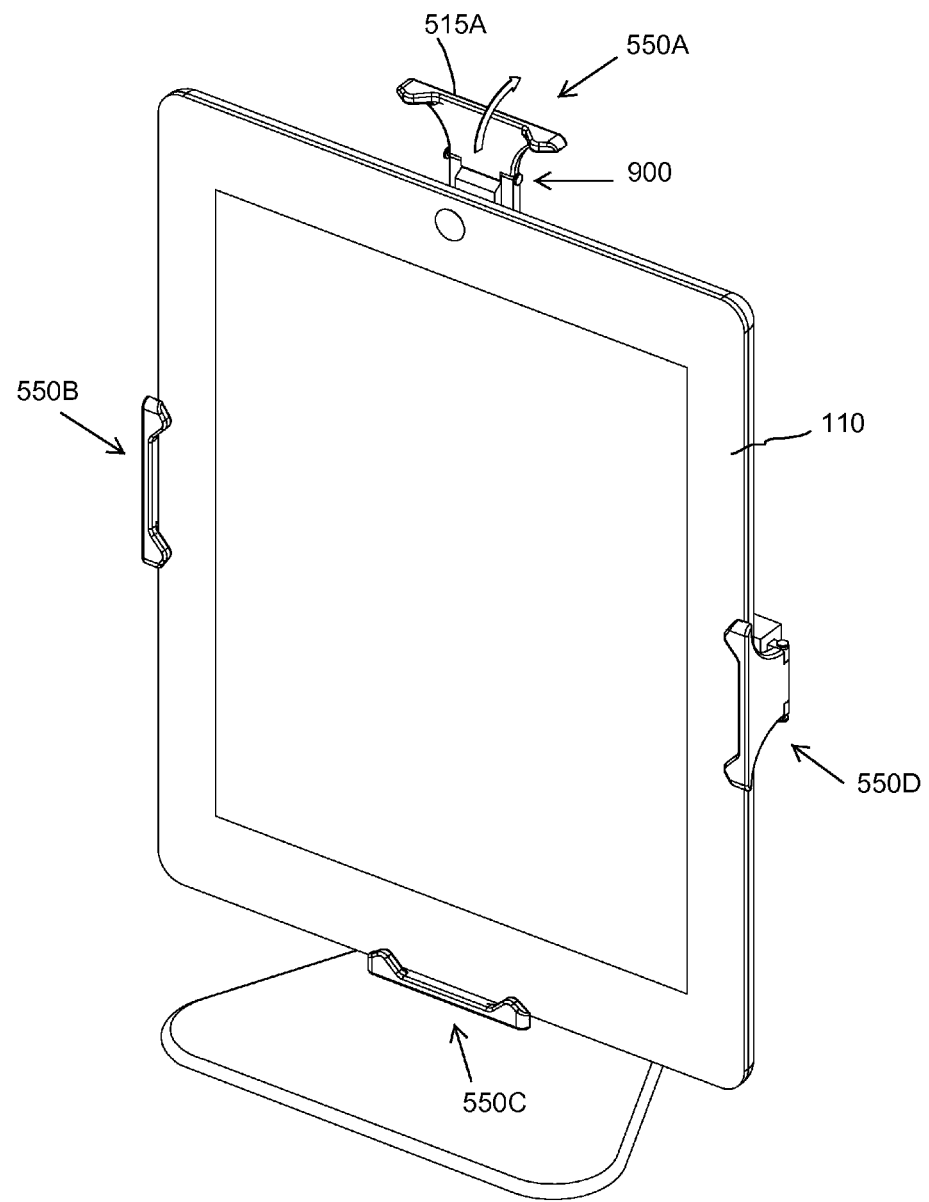
FIG. 13 illustrates a three-dimensional front perspective view of how a ledge of the quick-release universal tablet holder reacts to the press of the button of its associated rotation lock mechanism and enables a seated tablet computer to be removed from the quick-release universal tablet holder.

FIG. 13 illustrates a three-dimensional front perspective view of how a ledge of the quick-release universal tablet holder 515A reacts to the press of the button of its associated rotation lock mechanism 900 and enables a seated tablet computer 110 to be removed from the quick-release universal tablet holder 500.

Figure 14:
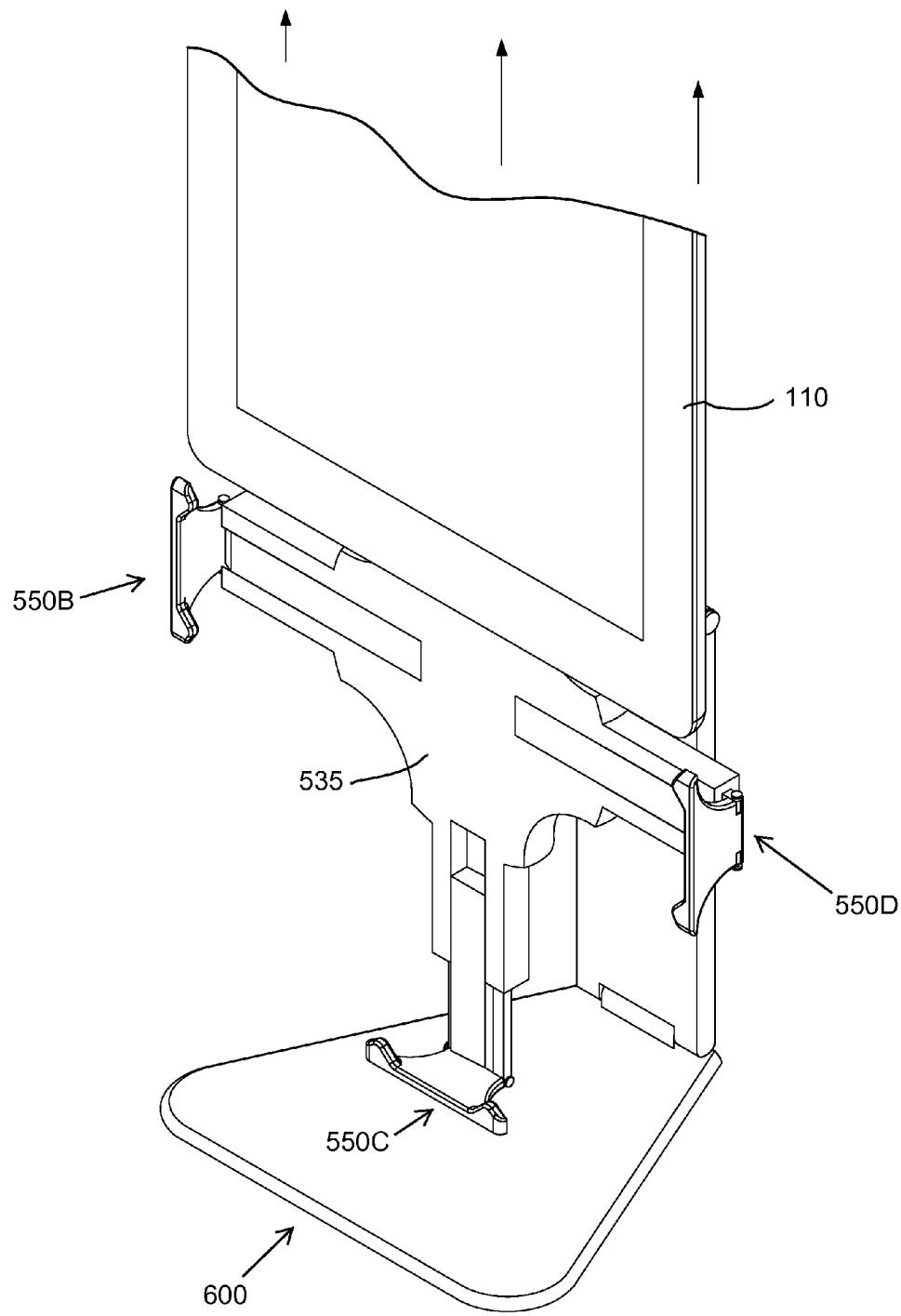
FIG. 14 illustrates a three-dimensional front perspective view of a how a tablet computer can be removed from a quick-release universal tablet holder.

FIG. 14 illustrates a three-dimensional front perspective view of a how a tablet computer 110 can be removed from a quick-release universal tablet holder 500.

FIG. 15 illustrates a cross-sectional side view of a tablet computer 110 seated in a quick-release universal tablet holder 500 mounted on a desktop stand 600. A locking hinge mechanism, such as shown in FIG. 7, may be used as a hinge between the upright panel 610 and the stem 640. Similarly, a locking hinge mechanism may be used as a hinge between the upright panel 610 and the base 605 as shown in FIGS. 16 and 17.

Figure 16:
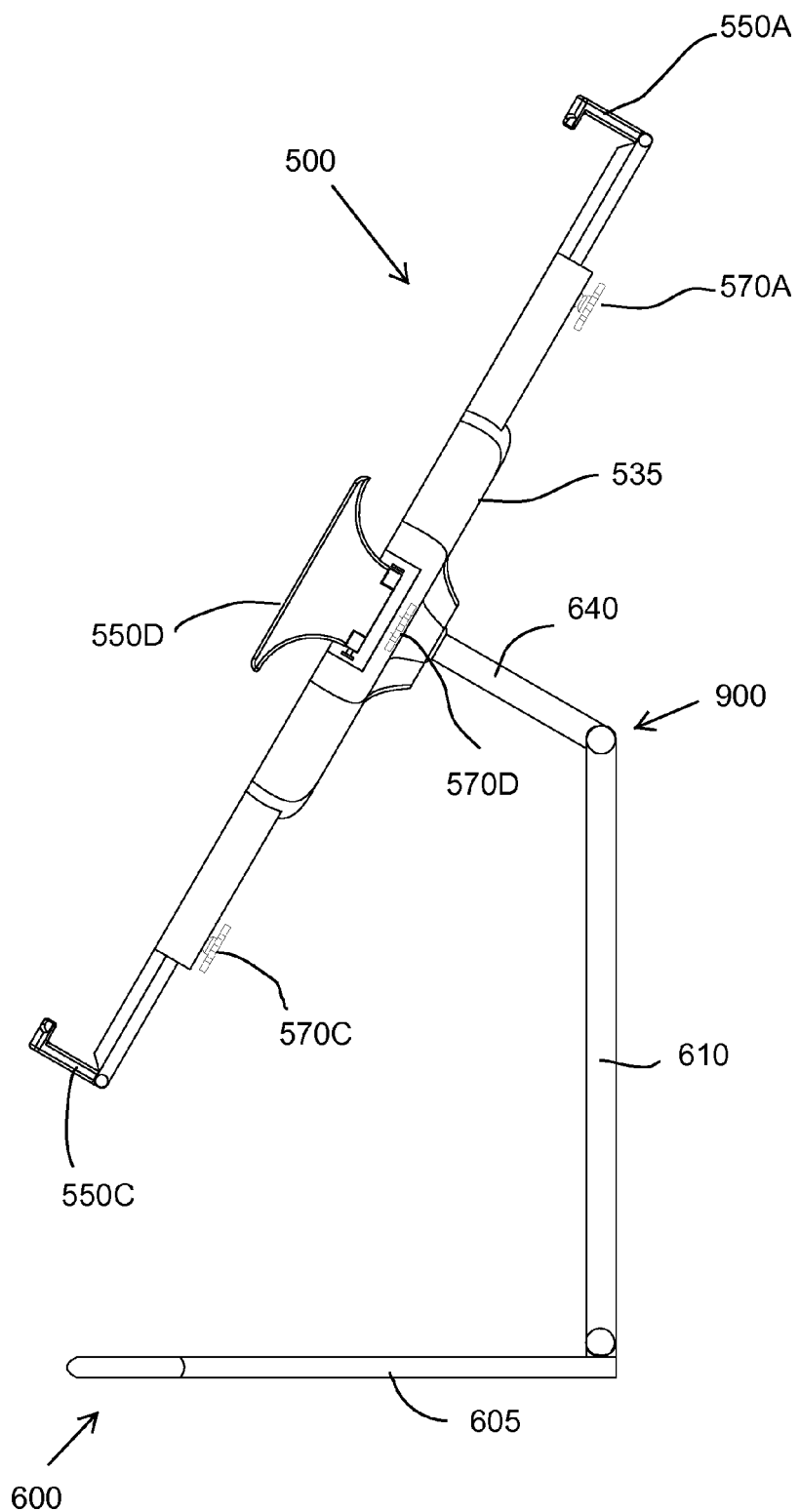
FIG. 16 illustrates a cross-sectional side view for a different orientation for a quick-release universal tablet holder mounted on a desktop stand.

FIG. 16 illustrates a cross-sectional side view for a different orientation for a quick-release universal tablet holder 500 mounted on a desktop stand 600.

Figure 17:
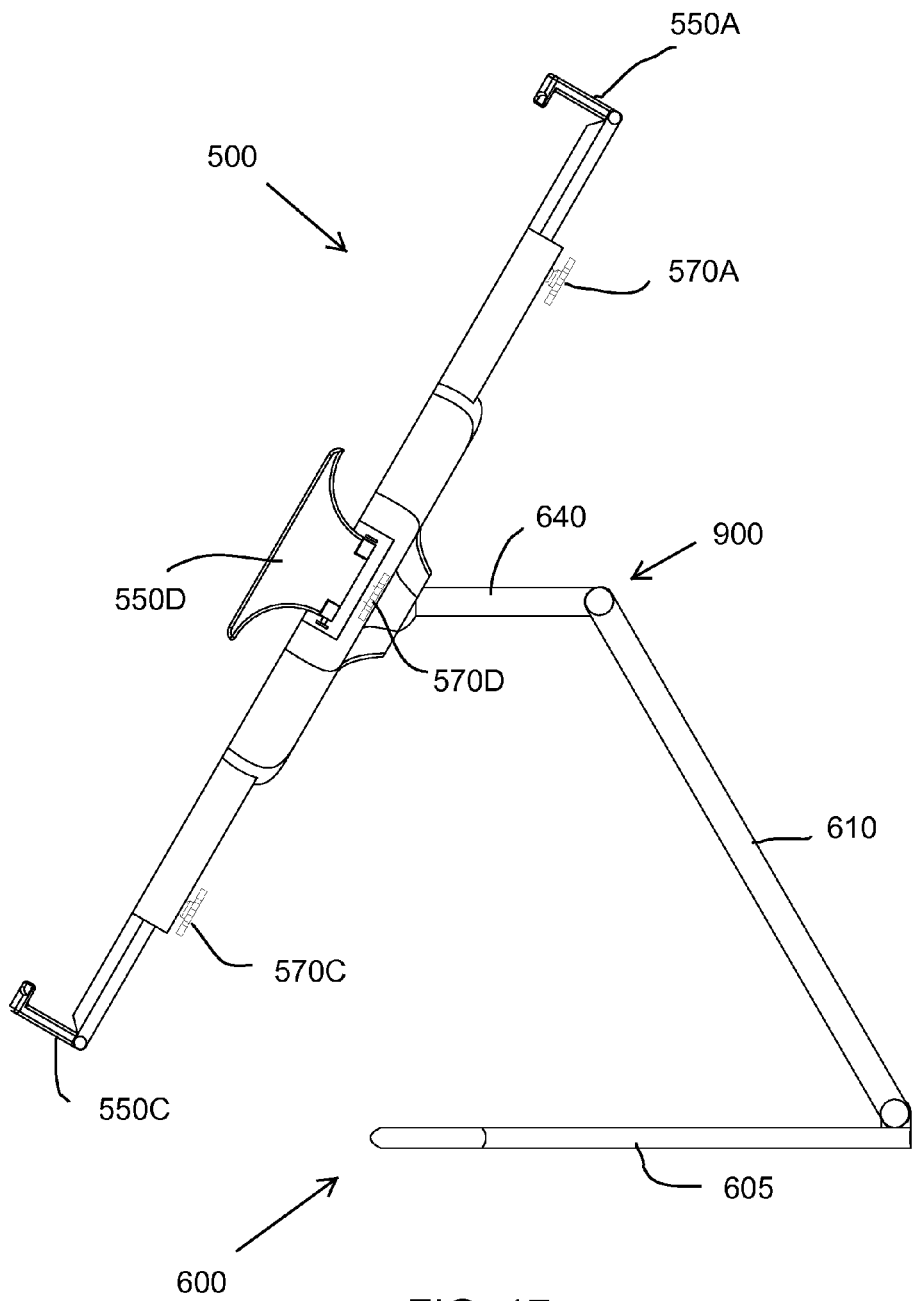
FIG. 17 illustrates a cross-sectional side view for yet another orientation for a quick-release universal tablet holder mounted on a desktop stand.

FIG. 17 illustrates a cross-sectional side view for yet another orientation for a quick-release universal tablet holder 500 mounted on a desktop stand 600.

Figure 18:
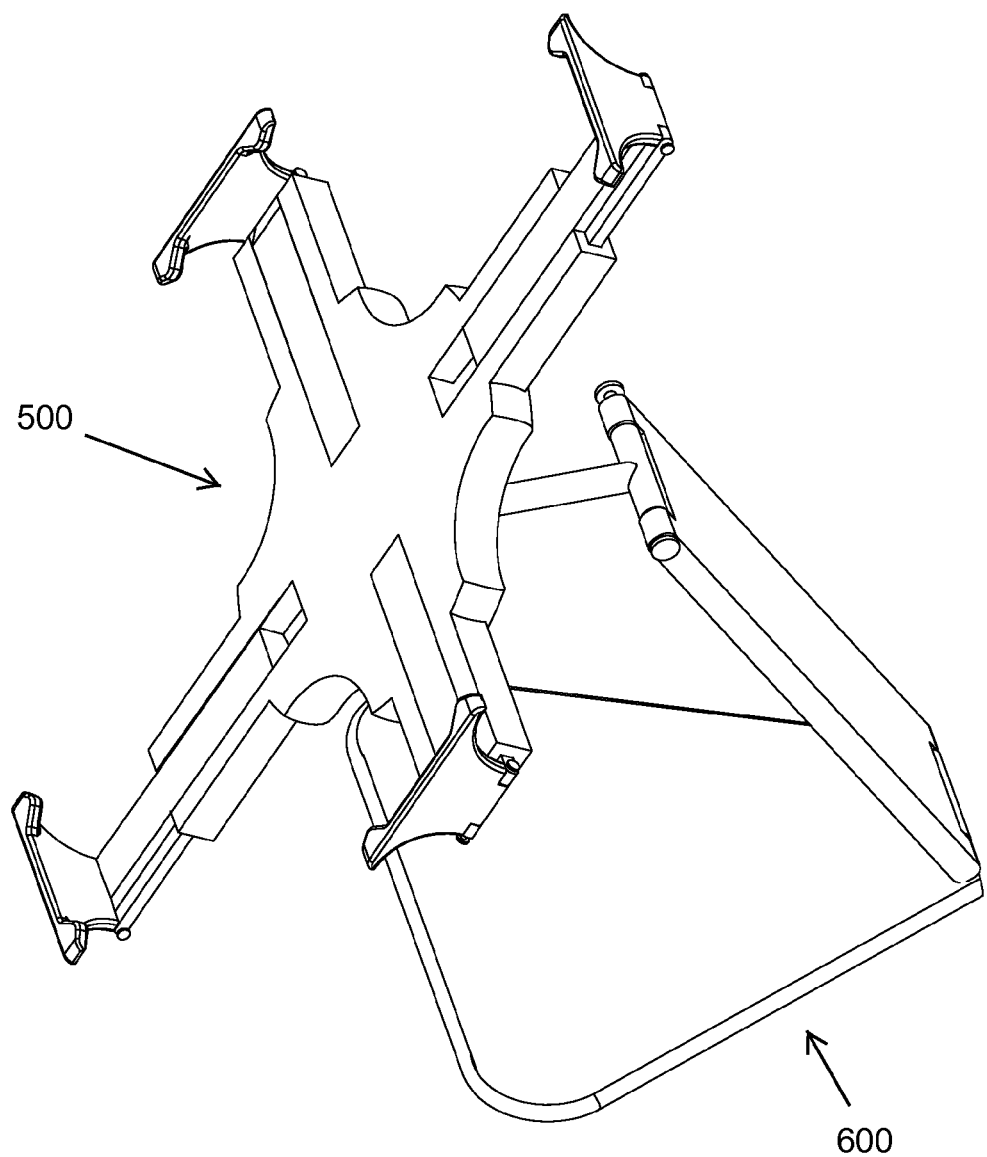
FIG. 18 illustrates a three-dimensional front perspective view of a quick-release universal tablet holder mounted on a desktop stand.

FIG. 18 illustrates a three-dimensional front perspective view of a quick-release universal tablet holder 500 mounted on a desktop stand 600.

Figure 19:
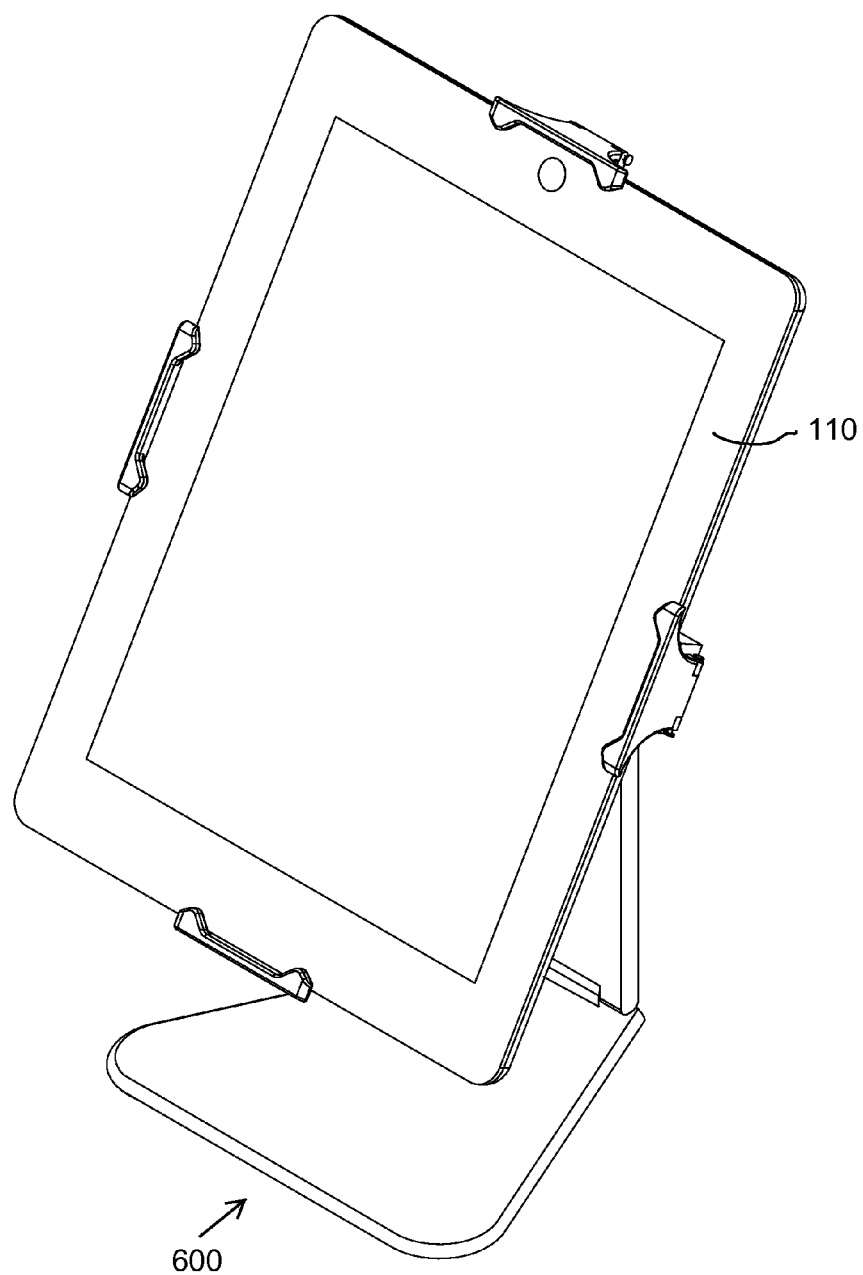
FIG. 19 illustrates a three-dimensional front perspective view of a tablet computer seated in a quick-release universal tablet holder mounted on a desktop stand.

FIG. 19 illustrates a three-dimensional front perspective view of a tablet computer 110 seated in a quick-release universal tablet holder 500 mounted on a desktop stand 600.

Figure 20:
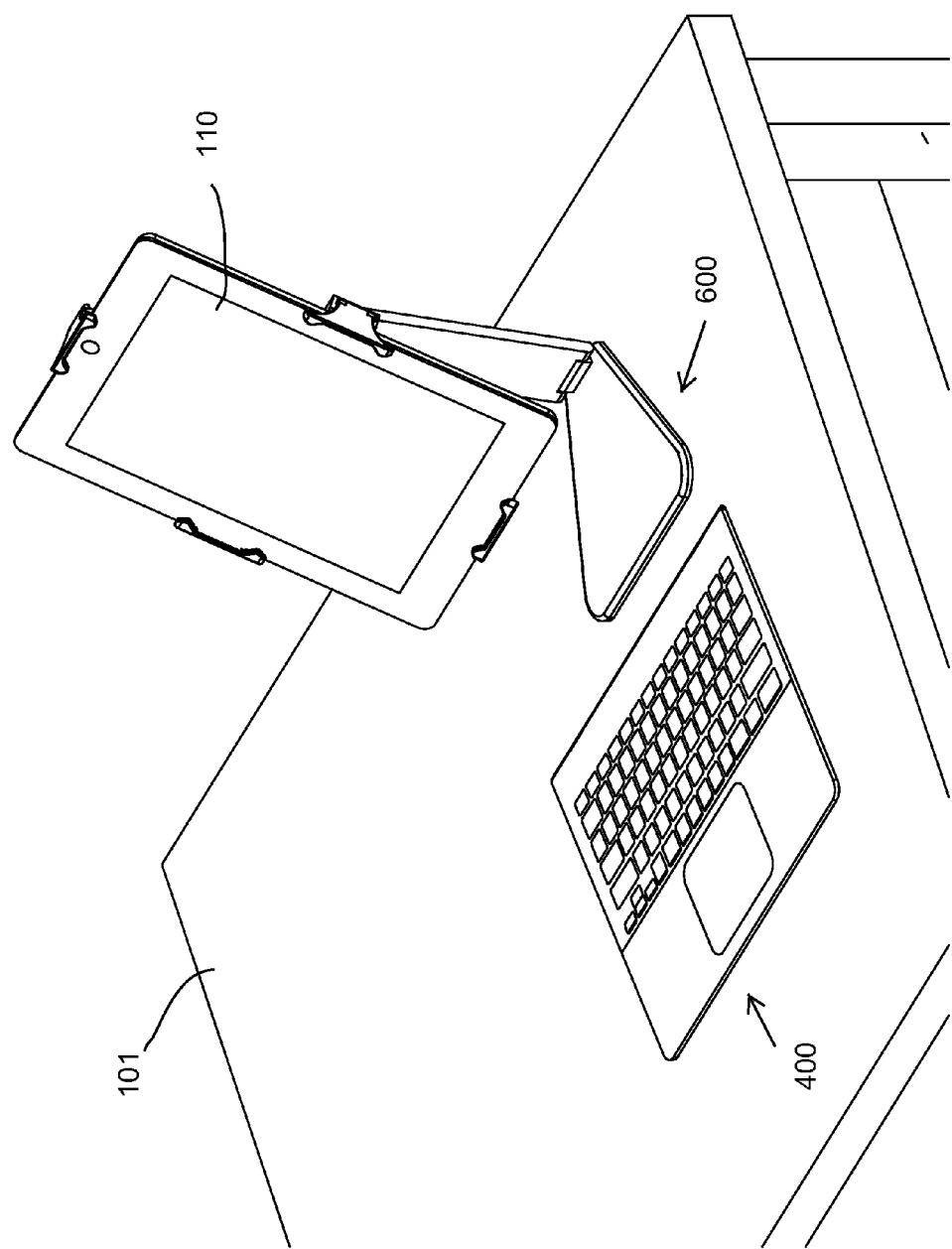
FIG. 20 illustrates a three-dimensional front perspective view of a tablet computer seated in a quick-release universal tablet holder mounted on a desktop stand resting on a flat surface with an associated wireless keyboard.

FIG. 20 illustrates a three-dimensional front perspective view of a tablet computer 110 seated in a quick-release universal tablet holder 500 mounted on a desktop stand 600 resting on a flat surface 101 with an associated wireless keyboard 400.

Figure 21:
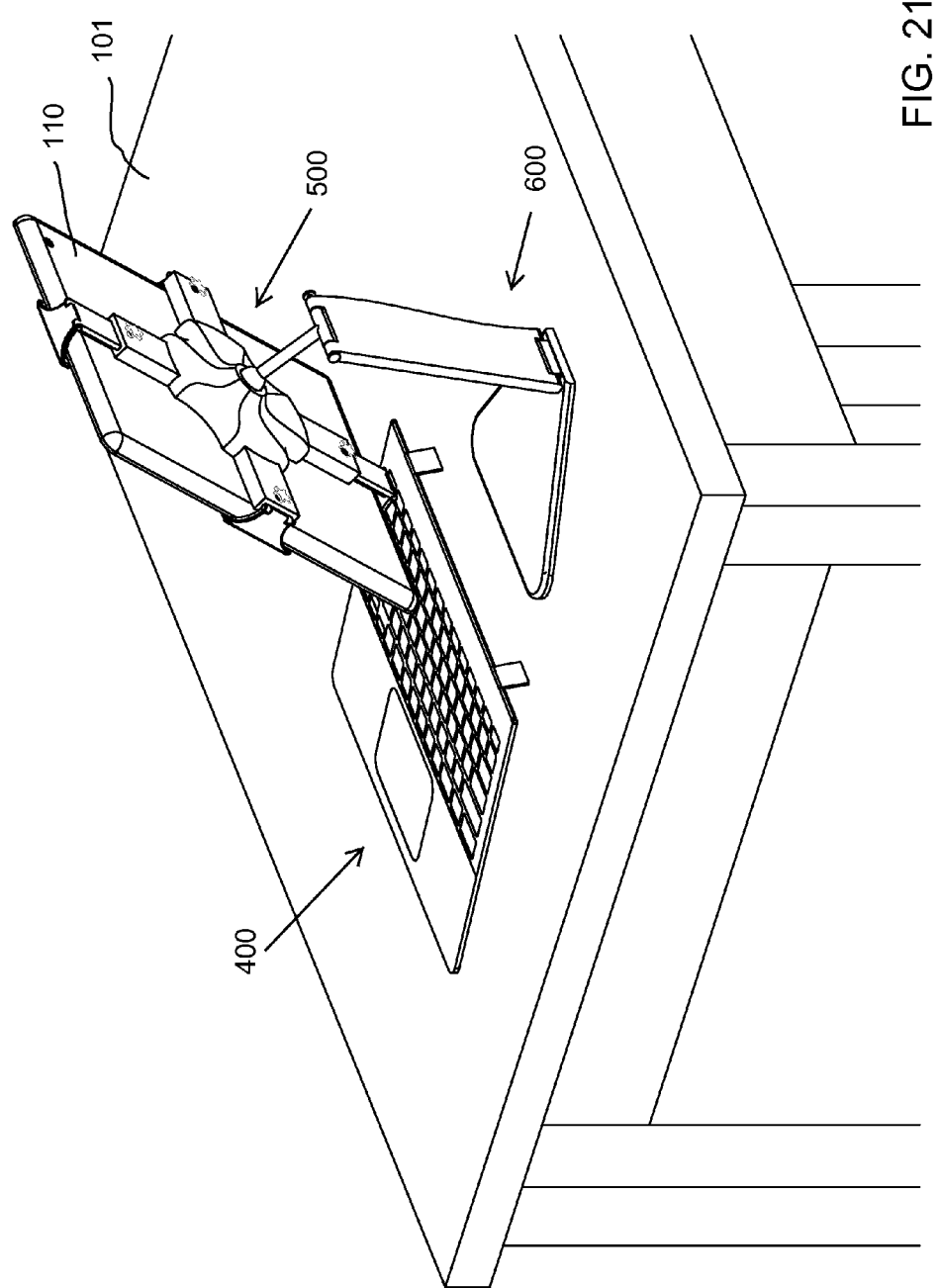
FIG. 21 illustrates a three-dimensional rear perspective view of a tablet computer seated in a quick-release universal tablet holder mounted on a desktop stand resting on a flat surface with an associated wireless keyboard.

FIG. 21 illustrates a three-dimensional back perspective view of a tablet computer 110 seated in a quick-release universal tablet holder 500 mounted on a desktop stand 600 resting on a flat surface 101 with an associated wireless keyboard 400.

Figure 22:
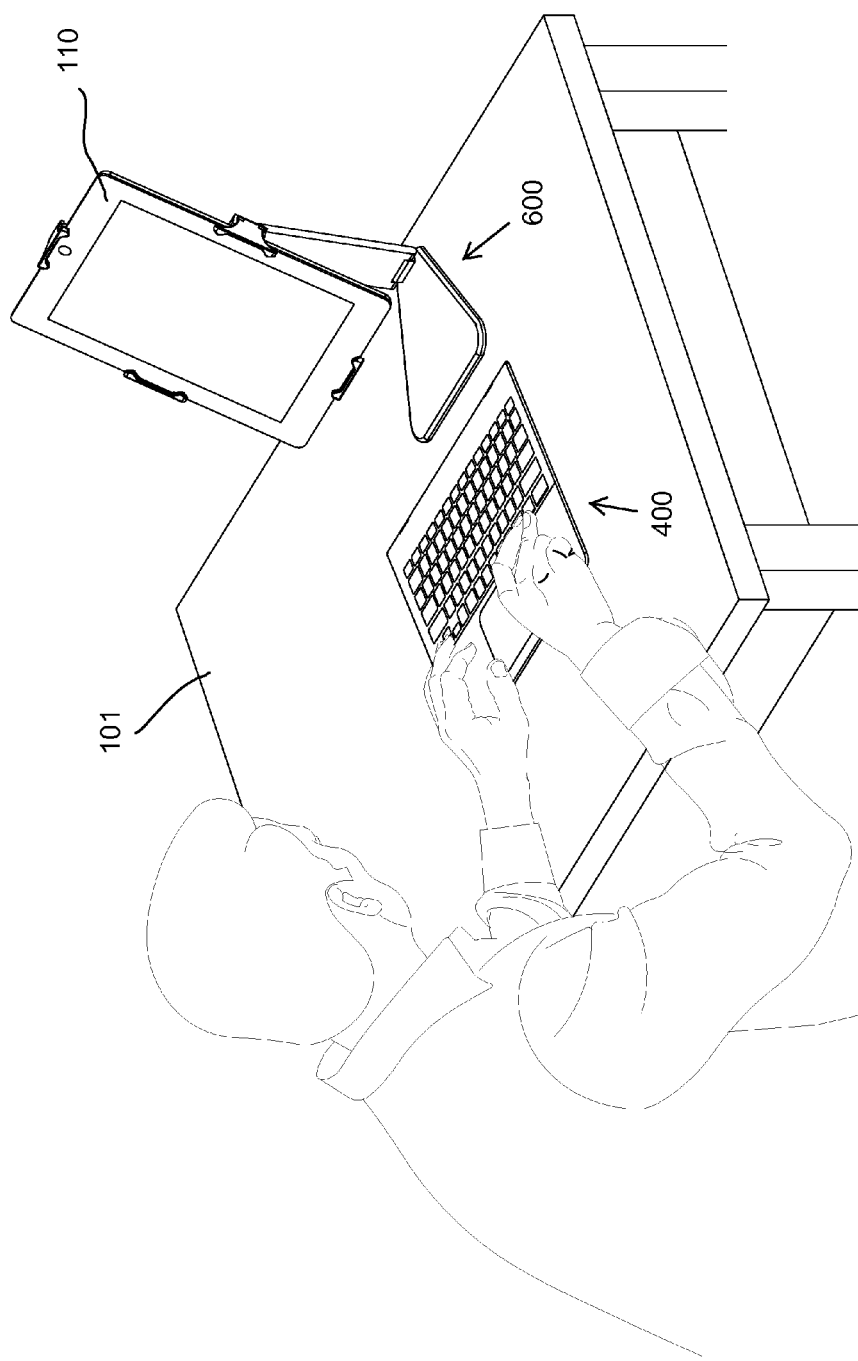
FIG. 22 illustrates a three-dimensional front perspective view of a person using a tablet computer seated in front of a quick-release universal tablet holder mounted on a desktop stand with an associated wireless keyboard.

FIG. 22 illustrates a three-dimensional front perspective view of a person using a tablet computer 110 seated in front of a quick-release universal tablet holder 500 mounted on a desktop stand 600 with an associated wireless keyboard 400.

Figure 23:
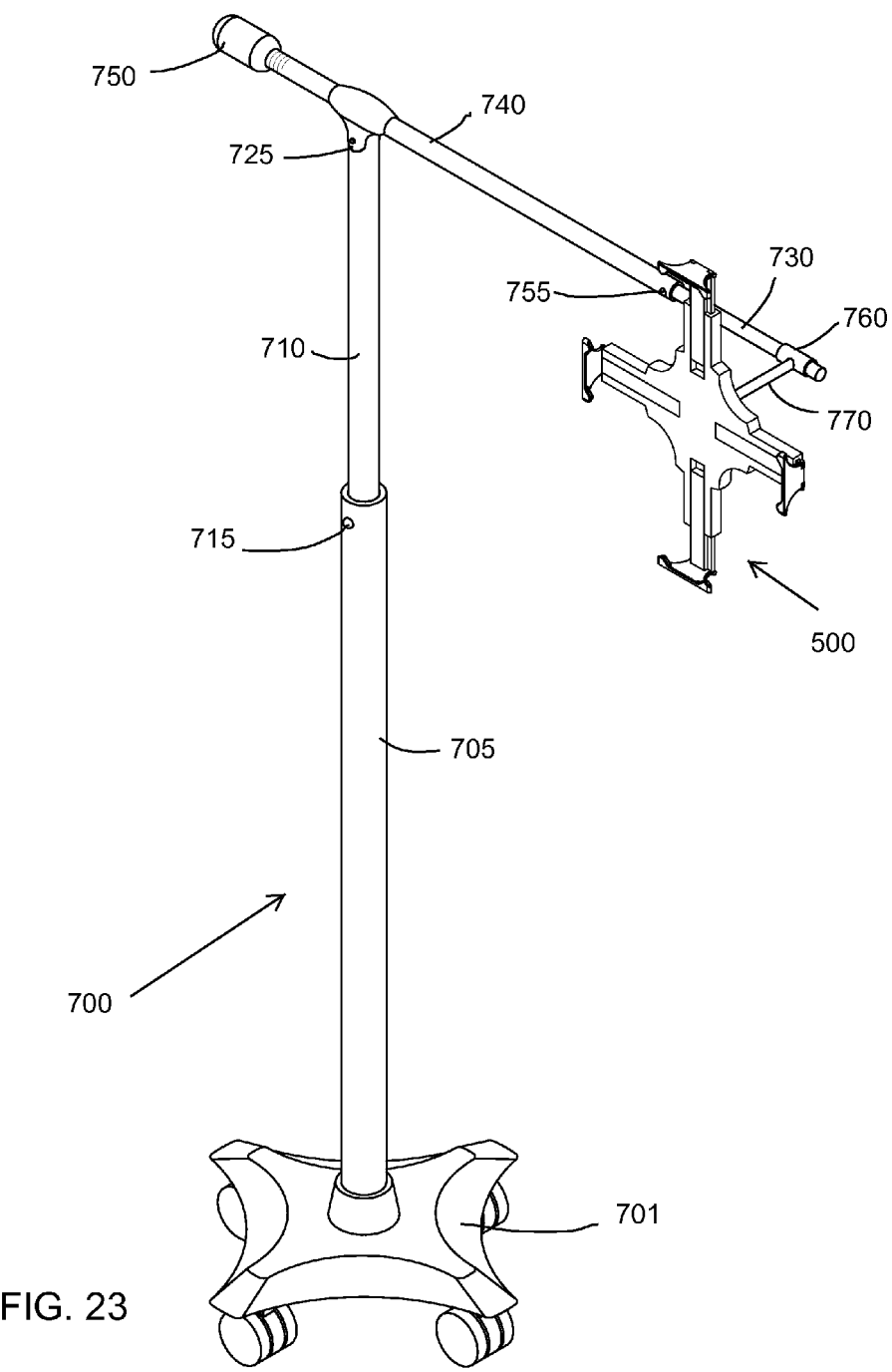
FIG. 23 illustrates a three-dimensional front perspective view of a quick-release universal tablet holder mounted on a floor stand.

FIG. 23 illustrates a three-dimensional front perspective view of a quick-release universal tablet holder 500 mounted on a floor stand 700. The floor stand includes a base 701 with wheels, upright telescoping stand with nested tubes 705, 710 with a detent 715 to lock the tubes in one of several selectable positions to adjust the height of the top of the stand. A T-junction 725 at the top of the stand supports an arm 740 that supports the tablet holder 500 and, at an opposite end of the arm, supports a counter weight 750. The arm may telescope by sliding tube 730 within a larger tube of the arm. A collar 760 with a stem 770 supports the tablet holder and slide over the arm to adjust the horizontal position of the tablet holder.

Figure 24:
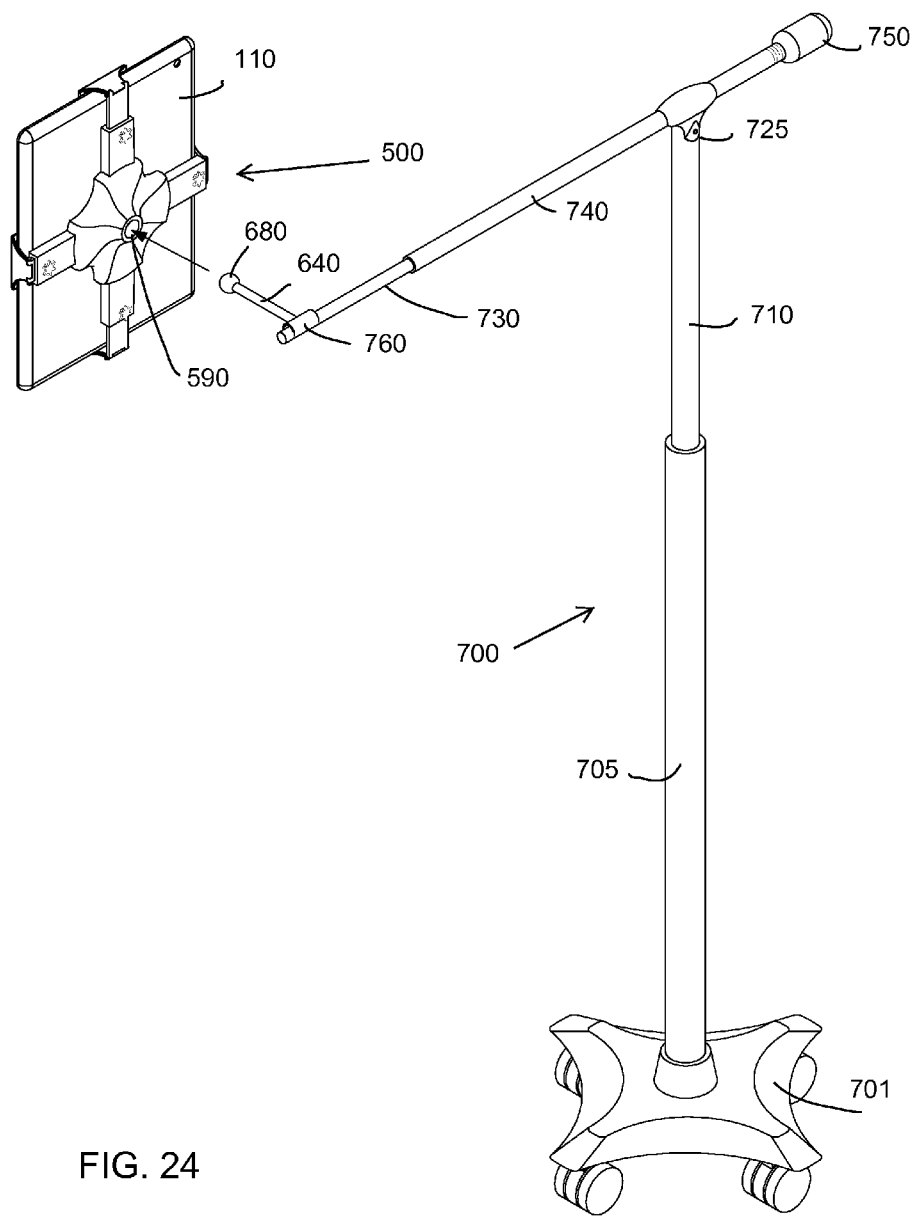
FIG. 24 illustrates a three-dimensional rear perspective view of a how a quick-release universal tablet holder can be mounted on a floor stand.

FIG. 24 illustrates a three-dimensional rear perspective view of a how a quick-release universal tablet holder 500 can be mounted on a floor stand 700 using a ball 680 and socket 580 mechanism.

Figure 25:
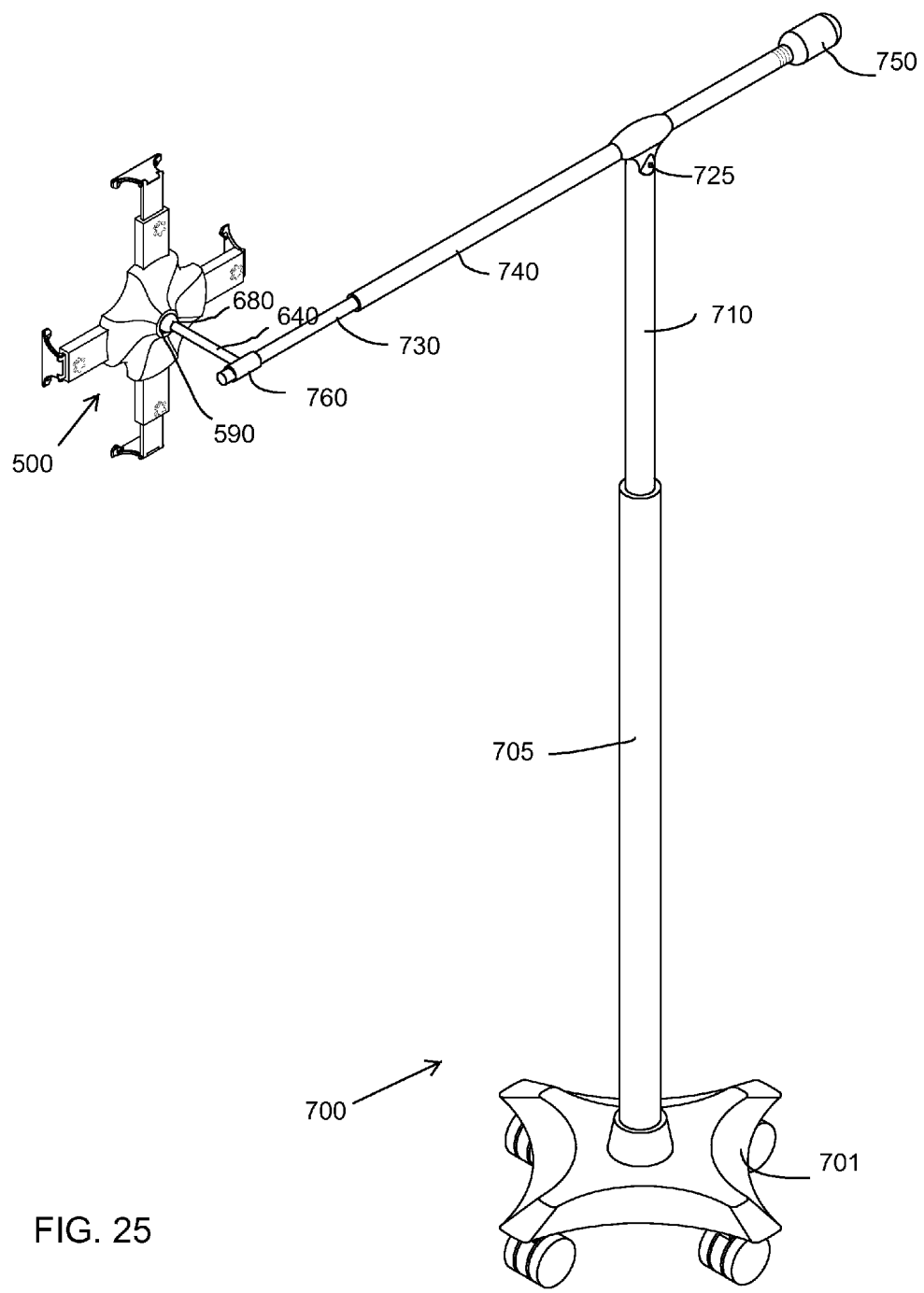
FIG. 25 illustrates a three-dimensional rear perspective view of a quick-release universal tablet holder mounted on a floor stand.

FIG. 25 illustrates a three-dimensional rear perspective view of a quick-release universal tablet holder 500 mounted on a floor stand 700.

Figure 26:
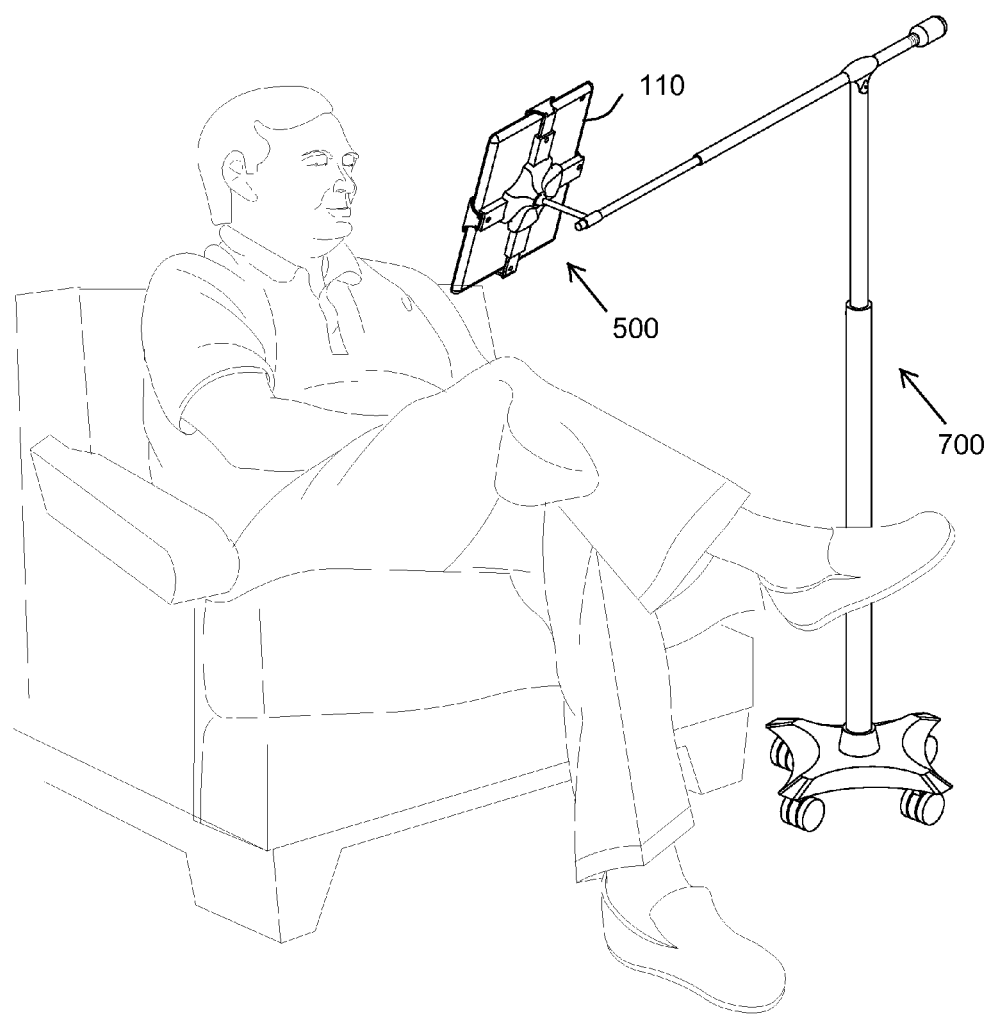
FIG. 26 illustrates a three-dimensional perspective view of how a tablet computer mounted on a quick-release universal tablet holder attached to a floor stand and positioned in a back leaning position can be of benefit to a user sitting on a couch.

FIG. 26 illustrates a three-dimensional perspective view of how a tablet computer 110 mounted on a quick-release universal tablet holder 500 attached to a floor stand 700 and positioned in a back leaning position can be of benefit to a user sitting on a couch.

Figure 27:
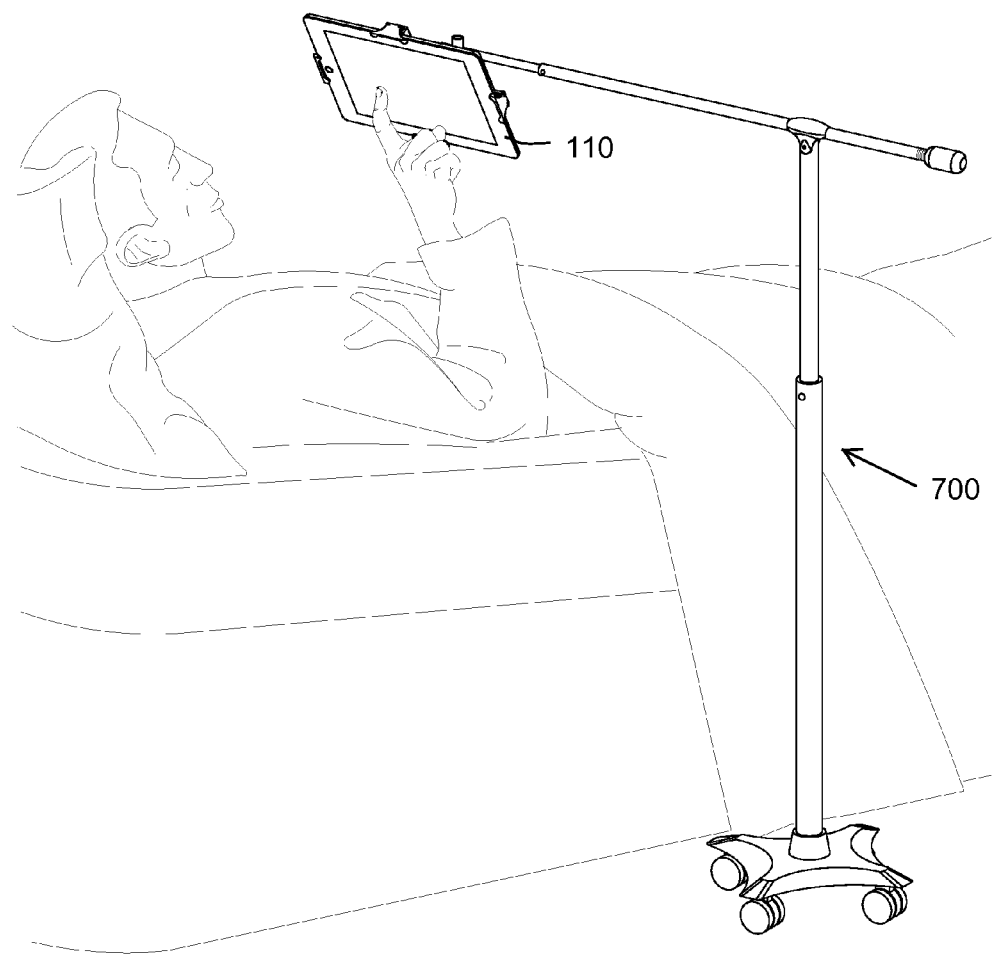
FIG. 27 illustrates a three-dimensional perspective view of how a tablet computer mounted on a quick-release universal tablet holder attached to a floor stand and positioned in a forward leaning position can be of benefit to a user lying in bed.

FIG. 27 illustrates a three-dimensional perspective view of how a tablet computer 110 mounted on a quick-release universal tablet holder 500 attached to a floor stand 700 and positioned in a forward leaning position can be of benefit to a user lying in bed.

I claim:
1. A tablet holder comprising:
   a mounting plate including a back surface with a coupling for a support device and a front surface with slots configured to receive arms, wherein each arm is configured to move independently of the other arms and is detachable from the mounting plate separately of the other arms;
   the arms are each slidably mounted in the slots and each include an end extending outward from the mounting plate;
   a locking mechanism releasably securing each of the arms to the mounting plate, and for each arm, a swiveling ledge is connected by a locking hinge to the end of the arm, wherein the hinge includes a releasable locking mechanism, wherein the locking hinge includes a shaft having a locking region with three or more facetted sides; wherein the locking region engages locking chambers in each of the arm and the swiveling ledge, and wherein the locking region slides out of the locking chambers as the user presses on the locking hinge, and the number of sides of the locking region on the shaft equals the number of at least three discrete angular positions of the locking mechanism.

2. The tablet holder of claim 1 wherein the arms include a first pair of arms and a second pair of arms perpendicular to the first pair of arms.

3. The tablet holder of claim 1 wherein the arms include a center ridge and flanges on opposite sides of the center ridge, wherein the flanges engage channels within the respective slot of the mounting plate.

4. The tablet holder of claim 1 wherein the hinge includes a default position at which the hinge is biased and sets a default angular position between the swiveling ledge and the arm.

5. The tablet holder of claim 1 wherein the locking mechanism includes for each arm a threaded shaft with at one end a knob and a threaded opening in the arm to receive an opposite end of the threaded shaft.

6. The tablet holder of claim 1 wherein the coupling includes at least one of a ball and socket.

7. A tablet holder comprising:
a mounting plate including a back surface with a coupling for a support device and a front surface with a slot configured to receive a first arm;
the first arm includes a beam having a cross section matching a cross section of the slot such that the beam slides into the slot and an end extending axially from the slot and the end is attached to a locking hinge;
a locking mechanism releasably secures the first arm to the mounting plate to prevent sliding of the beam in the slot, and
a swiveling ledge connected the locking hinge to the end of the first arm, wherein the hinge includes a releasable locking mechanism configured to lock the swiveling ledge in a plurality of discrete angular positions with respect to the first arm.

8. The tablet holder of claim 7 further comprising a second slot in the mounting plate configured to receive a second arm, wherein the second arm is opposite to the first arm and a ledge on the second arm is opposite to the swiveling ledge on the first arm.

9. The tablet holder of claim 8 further comprising a second pair of arms perpendicular to the first and second arms.

10. The tablet holder of claim 7 wherein the locking hinge includes a shaft having a locking region with faceted sides, wherein the locking region engages locking chambers in each of the first arm and the swiveling ledge and the locking region slides out of the locking chambers as the user presses on the locking hinge.

11. The tablet holder of claim 7 wherein the beam of the first arm includes a center ridge and flanges on opposite sides of the center ridge, wherein the flanges engage channels within the first slot of the mounting plate.

12. The tablet holder of claim 7 wherein the locking hinge includes a default position at which the hinge is biased and sets a default angular position between the swiveling ledge and the arm.

13. The tablet holder of claim 7 wherein the locking mechanism includes for each arm a threaded shaft with at one end a knob and a threaded opening in the arm to receive an opposite end of the threaded shaft.

14. The tablet holder of claim 1 wherein the coupling includes at least one of a ball and socket.

15. A tablet holder comprising:
a mounting plate including a back surface with a coupling for a support device and a front surface with a first and second slot aligned along a first line, and a third and fourth slot aligned along a second line perpendicular to the first line, wherein each of the first, second, third and fourth slots have cross sections with opposing channels and an open gap to the front surface;
the first, second, third and fourth arms each including a beam having a cross section configured to slide into a respective one of the first, second, third and fourth slots, and each of the arms is configured to slide independently with respect to the sliding of the other arms;
a locking mechanism for each of the arms that releasably secures the arm to the mounting plate to prevent sliding of the beam in the slot, and
a swiveling ledge connected to a locking hinge at an end of each of the arms, wherein the hinge includes a releasable locking mechanism, wherein the swiveling ledges on each of the first, second, third and fourth arms are in a plane, and
wherein the releasable locking mechanism is configured to lock the swiveling ledge in at least three discrete angular positions with respect to the arm.

16. A tablet holder comprising:
a mounting plate including a back surface with a coupling for a support device and a front surface;
four detachable arms mounted slidably to the mounting plate and each of the arms is coaxial with one of the arms and orthogonal to the other two arms, wherein the arms are each configured to slide with respect to the mounting plate such that an end of each the arm extends beyond the perimeter of the mounting plate, and each of the arms slides independently of the other arms, and
a swiveling ledge and releasable locking hinge assembly mounted to the end of each of the arms, wherein releasable locking hinge is configured to lock the swiveling ledge at a plurality of discrete and predetermined angular positions with respect to the arm.

17. The tablet holder of claim 16 wherein the plurality of discrete angular positions includes at least three discrete angular positions all of which are within a range of zero to ninety degrees.

18. A tablet holder comprising:
a mounting plate including a back surface with a coupling for a support device and a front surface;
arms mounted slidably to the mounting plate, wherein the arms are configured to slide with respect to the mounting plate such that an end of each the arm extends beyond the perimeter of the mounting plate, and
a swiveling ledge and releasable locking hinge assembly mounted to the end of each of the arms, wherein releasable locking hinge is configured to lock the swiveling ledge in at least three discrete angular positions with respect to the arm,
wherein the releasable locking hinge assembly includes a shaft having a first locking region with faceted sides on an outer circumference of the shaft, and a chamber coaxial with and receiving the shaft, and the chamber includes a second locking region with faceted sides on an inner wall of the chamber, and wherein the first locking region and second locking region are configured by virtue of the faceted sides to be slidably engage to lock an angular position of the locking hinge and to allow the locking hinge to pivot.

19. The tablet holder of claim 18 wherein the at least three discrete angular positions equal in number of positions to a number of the faceted sides on the first or second locking regions.

* * * * *